(12) United States Patent
Belz et al.

(10) Patent No.: US 6,980,552 B1
(45) Date of Patent: *Dec. 27, 2005

(54) PIPELINED PACKET SWITCHING AND QUEUING ARCHITECTURE

(75) Inventors: David Belz, Raanana (IL); Garry P. Epps, Sunnyvale, CA (US); Michael Laor, Zichron Yaakov (IL); Eyal Oren, Tel Aviv (IL)

(73) Assignee: Cisco Technology, Inc., San Jose, CA (US)

( * ) Notice: Subject to any disclaimer, the term of this patent is extended or adjusted under 35 U.S.C. 154(b) by 285 days.

This patent is subject to a terminal disclaimer.

(21) Appl. No.: 10/219,460

(22) Filed: Aug. 15, 2002

Related U.S. Application Data

(63) Continuation-in-part of application No. 09/503,552, filed on Feb. 14, 2000.

(51) Int. Cl.[7] .................. H04L 12/28; H04L 12/56
(52) U.S. Cl. ........................... 370/392; 370/412
(58) Field of Search ................... 370/389, 392, 370/412, 428, 429

(56) References Cited

U.S. PATENT DOCUMENTS

| | | | | |
|---|---|---|---|---|
| 5,938,736 | A | * | 8/1999 | Muller et al. ............... 709/243 |
| 6,104,700 | A | * | 8/2000 | Haddock et al. ............ 370/235 |
| 6,147,996 | A | * | 11/2000 | Laor et al. ................. 370/394 |
| 6,658,002 | B1 | * | 12/2003 | Ross et al. ................. 370/392 |
| 6,658,015 | B1 | * | 12/2003 | Merchant et al. ........... 370/422 |

* cited by examiner

Primary Examiner—Seema S. Rao
Assistant Examiner—Kevin C. Harper
(74) Attorney, Agent, or Firm—Campbell Stephenson Ascolese LLP; Marc R. Ascolese

(57) ABSTRACT

A pipelined linecard architecture for receiving, modifying, switching, buffering, queuing and dequeuing packets for transmission in a communications network. The linecard has two paths: the receive path, which carries packets into the switch device from the network, and the transmit path, which carries packets from the switch to the network. In the receive path, received packets are processed and switched in a multi-stage pipeline utilizing programmable data structures for fast table lookup and linked list traversal. The pipelined switch operates on several packets in parallel while determining each packet's routing destination. Once that determination is made, each packet is modified to contain new routing information as well as additional header data to help speed it through the switch. Using bandwidth management techniques, each packet is then buffered and enqueued for transmission over the switching fabric to the linecard attached to the proper destination port. The destination linecard may be the same physical linecard as that receiving the inbound packet or a different physical linecard. The transmit path includes a buffer/queuing circuit similar to that used in the receive path and can include another pipelined switch. Both enqueuing and dequeuing of packets is accomplished using CoS-based decision making apparatus, congestion avoidance, and bandwidth management hardware.

33 Claims, 22 Drawing Sheets

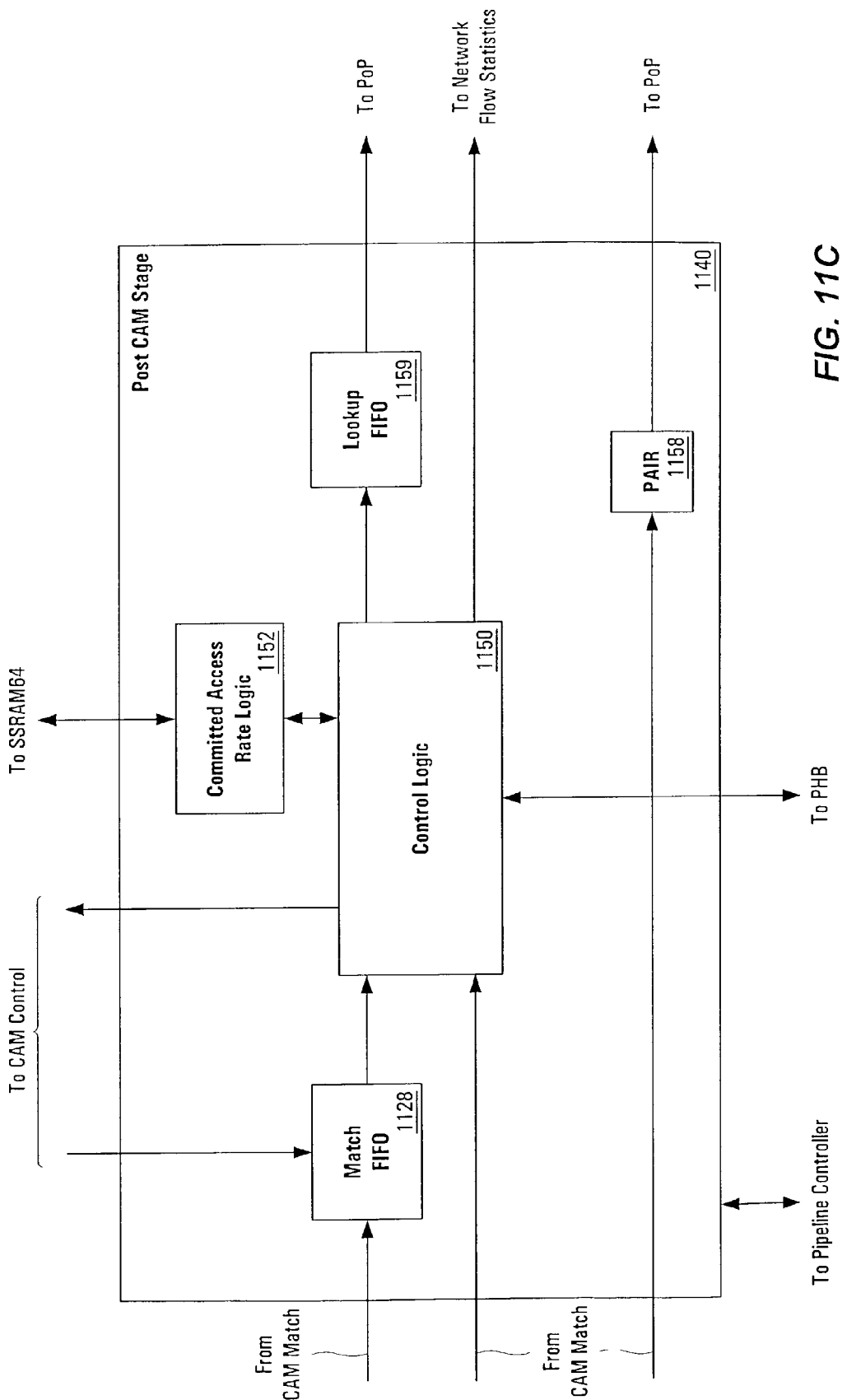

PIPELINED PACKET SWITCHING AND QUEUING ARCHITECTURE

This application is a continuation-in-part of application Ser. No. 09/503,552, filed Feb. 14, 2000, and entitled "Pipelined Packet Switching And Queuing Architecture," naming Garry P. Epps and Michael Laor as inventors, hereinafter referred to as the "'552 application." The above-referenced applications are hereby incorporated by reference herein in their entirety.

BACKGROUND OF THE INVENTION

1. Field of the Invention

The present invention relates to communications devices, specifically devices that enable packet forwarding and handling in communications networks.

2. Description of the Related Art

In a communications network, routing devices receive messages at one of a set of input interfaces and forward them on to one or more of a set of output interfaces. Users typically require that such routing devices operate as quickly as possible in order to keep up with the high rate of incoming messages. In a packet routing network, where information is transmitted in discrete chunks or "packets" of data, each packet includes a header. The header contains information used for routing the packet to an output interface and subsequent forwarding to a destination device. The packet may also be forwarded to another router for further processing and/or forwarding. Header information used for routing may include the destination address and source address for the packet. Additionally, header information such as the destination device port, source device port, protocol, packet length, and packet priority may be used. Header information used by routing devices for administrative tasks may include information about access control, accounting, quality of service (QOS), or class of service (COS).

FIG. 1 is a generic packet routing/switching system 100 that will be used to describe both the prior art and the invention. A well-known routing device or switch 100 consists of a set of linecards 110 and a switching fabric 120. Each linecard 110 includes an input interface 111, an output interface 112, a fabric interface 170, and a control element 130. Linecards 110 connect to communications network 1, which may be any form of local, enterprise, metropolitan, or wide area network known in the art, through both input interface 111 and output interface 112. More than one input interface 111 may be provided, with each interface carrying a fraction of the full capacity of control element 130.

Control element 130 is configured to receive inbound packets (i.e., packets entering the system from network 1) from input interface 111, process the packets, and transmit them through fabric interface 170 to switching fabric 120 through which the packets are sent to another (or the same) linecard 110 for further processing. This path is referred to as the "receive" path into the device from the network.

Outbound packets (i.e., those to be transmitted out of the switch device) are received from switching fabric 120 through fabric interface 170, processed in control element 130, and transmitted to network 1 on output interface 112. Accordingly, this path is known as the "transmit" path from the device to the network.

As known in the prior art, control element 130 includes an inbound packet receiver 140, lookup circuit 145, inbound memory controller 150, first memory 160, outbound memory controller 150, second memory 160, and outbound transmitter 180. Control circuits 190 are also provided to perform configuration, initialization, statistics collection, and accounting functions as well as to process certain exception packets.

In a manner well-known in the art, packets are received from the physical medium of the network at input interface 111. The inbound packet receiver 140 operates in conjunction with lookup circuit 145 to determine routing treatments for inbound packets. Lookup circuit 145 includes routing treatment information disposed in a memory data structure. Access and use of this information in response to data in the header of an inbound packet is accomplished with means well-known in the router art. These routing treatments can include one or more of the following:

selection of one or more output interfaces to which to forward inbound packets responsive to the destination device, to the source and destination device, or to information in any other packet header fields (packets may also be dropped, i.e., not forwarded);

determination of access control list (ACL) treatment for inbound packets;

determination of class of service (COS) treatment for inbound packets;

determination of one or more accounting records or treatments for inbound packets; and determination of other administrative treatment for inbound packets.

Examples of such systems may be found in U.S. Pat. No. 5,088,032, METHOD AND APPARATUS FOR ROUTING COMMUNICATIONS AMONG COMPUTER NETWORKS to Leonard Bosack; U.S. Pat. No. 5,509,006, APPARATUS AND METHOD FOR SWITCHING PACKETS USING TREE MEMORY to Bruce Wilford et al.; U.S. Pat. No. 5,852,655, COMMUNICATION SERVER APPARATUS HAVING DISTRIBUTED SWITCHING AND METHOD to John McHale et al.; and U.S. Pat. No. 5,872,783, ARRANGEMENT FOR RENDERING FORWARDING DECISIONS FOR PACKETS TRANSFERRED AMONG NETWORK SWITCHES to Hon Wah Chin, incorporated in their entireties herein by reference.

One shortcoming of prior art packet routing/switching systems has been the inability of a general purpose digital computer to perform the necessary lookup and queue management functions using software in real time, i.e., approaching the wire speed (line rate) of the incoming packets. As the need for increased packet throughput has grown, software-based systems have been shown to lack sufficient scalability to the demands of modern internetworking systems.

A further drawback is the lack of flexibility in prior art systems tuned for speed with hardware implementations of functions once performed by software. As the hardware is less able to be reconfigured without redesign, these prior art designs are often rendered obsolete by the adoption of new standards and communications protocols.

A still further drawback of prior art systems is their relative inability to rapidly provide a range of services based on packet priority, as represented by various fields in the packet header. Such systems are often described as providing type of service (TOS), quality of service (QOS), or class of service (COS) routing. Prior art systems typically experience additional packet latency and throughput reduction when performing routing based on packet priority. In particular, so-called "edge" features associated with, for example, leased-line aggregation (aka optical aggregation) and content aggregation are in particular need of support by new routers.

What is needed is a flexible switch system, preferably distributed on a linecard, that provides ultra-high throughput packet switching based at least in part on packet priority. The system architecture should be able to be reconfigured to handle a variety of network protocols and optimizations. In particular, low latency switching determined by individual packet class of service is desired. Such a linecard should operate as close to line rate as possible, i.e., at or near the maximum speed of transmission over the physical medium and without any appreciable buffering delay.

SUMMARY

A pipelined linecard architecture for receiving, modifying, switching, buffering, and queuing packets for transmission in a communications network is disclosed. The linecard has two paths: the receive path, which carries packets into the switch device from the network and the transmit path, which carries packets from the switch to the network. While each linecard typically has both a receive and a transmit path, such an arrangement is not essential. Separate transmit and receive linecards employing the architecture of the present invention are also possible.

In the receive path, packets are processed and switched in a multi-stage pipeline that operates on several packets at the same time to determine each packet's routing destination. Once that determination is made, each packet is modified to contain new routing information as well as additional header data to help speed it through the switch. Using bandwidth management techniques, each packet is then buffered and enqueued for transmission over the switching fabric to the linecard attached to the proper destination port. The destination linecard may be the same physical linecard as that receiving the inbound packet or a different physical linecard.

The transmit path includes a buffer/queuing circuit similar to that used in the receive path and can include another pipelined switch. Both enqueuing and dequeuing of packets is accomplished using CoS-based decision making apparatus, congestion avoidance, and bandwidth management hardware.

When used in both the receive and transmit paths, the two pipelined switches can cooperate in performing certain switch/routing tasks. For example, initial packet processing might occur on a packet as it is received and passes through a pipelined switch in the receive path, while subsequent but related processing might occur as the packet passes through a pipelined switch in the transmit path. Thus, when the two pipelined switches are used cooperatively in both the receive and transmit paths, a packet switching/routing pipeline is effectively formed across the switching fabric, i.e., the switching fabric is "inside" the pipeline.

The architecture of the present invention has the advantages of high throughput and the ability to rapidly implement new features and capabilities.

Accordingly, one aspect of the present invention provides an apparatus for switching packets. Each packet has a header portion, an optional corresponding tail portion, and a class of service indicator. The apparatus includes a pipelined switch having a plurality of packet header buffers (PHBs), a plurality of PHB pointers, and a plurality of pipeline stage circuits. Each of the plurality of PHB pointers points to a PHB. Each of the plurality of pipeline stage circuits begins an operation substantially simultaneously with each other of the plurality of pipeline stage circuits. Each of the plurality of pipeline stage circuits passes data to a next stage circuit. At least one of the plurality of pipeline stage circuits is operable to access a content addressable memory. The first stage circuit reads the header portion and stores the header portion in at least one of the plurality of PHBs using at least one of the plurality of PHB pointers. The last stage circuit outputs a modified header portion.

In another aspect of the present invention, a method of switching packets is provided. A packet having a header portion, an optional corresponding tail portion, and a class of service indicator is received. The packet is switched through a pipelined switch having a plurality of packet header buffers (PHBs), a plurality of PHB pointers wherein each of the plurality of PHB pointer points to a corresponding one of the plurality of PHBs, and a plurality of pipeline stages connected in a sequence. The plurality of pipeline stages includes at least a first stage and a last stage. The sequence begins in each of the plurality of pipeline stages substantially simultaneously with each other of the plurality of pipeline stages. Data is passed to a next stage in the sequence when an operation performed by each of the plurality of pipeline stages is completed. A content addressable memory is accessed as part of the operation performed by at least one of the plurality of pipeline stages. The header portion is read and stored in one of the plurality of PHBs using at least one of the plurality of PHB pointers. A modified header portion is outputted based on the header portion.

In still another aspect of the present invention, an apparatus for switching packets is provided. Each packet has a header portion, an optional corresponding tail portion, and a class of service indicator. The apparatus includes a plurality of buffers, a plurality of buffer pointers, and a plurality of means for processing packets. Each of the plurality of buffer pointers points to a buffer. The plurality of means for processing packets are connected in a sequence. Each of the plurality of means for processing packets begins an operation substantially simultaneously with each other of the plurality of means for processing packets. At least one of the plurality of means for processing packets passes data to at least another of the plurality of means for processing packets. At least one of the plurality of means for processing packets further comprises a means for accessing a content addressable memory. At least one of the plurality of means for processing packets further comprises a means for reading the header portion and storing the header portion in at least one of the plurality of buffers. At least one of the plurality of means for processing packets further comprises a means for outputting a modified header portion.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

The present disclosure may be better understood, and its numerous objects, features, and advantages made apparent to those skilled in the art by referencing the accompanying drawings.

FIG. 11C is a high-level schematic of post-content addressable memory (Post-CAM) pipeline stage 1140 of CAMP block 430 according to one embodiment of the present invention.

The use of the same reference symbols in different drawings indicates similar or identical items.

DETAILED DESCRIPTION

The following sets forth a detailed description of at least the best contemplated mode for carrying out the one or more devices and/or processes described herein. The description is intended to be illustrative and should not be taken to be limiting.

The present invention is an architecture for a linecard in a network communications device such as a router or switch. The linecard provides an interface between a routing or switching device and a network that operates bi-directionally, both receiving a data stream (e.g., packets) from the network and transmitting a data stream to the network. Typical devices comprise multiple linecards (and thus multiple network connections) and a single switching interconnect core or "fabric" that provides the physical connection between linecards.

Among the more desirable "edge" features that can be supported by the systems and methods of the present application are: access control lists (ACLs) or extended access control lists (Ex-ACLs); committed access rate (CAR); and network data flow statistics (e.g., Cisco IOS™ NetFlow data). ACLs and Ex-ACLs are used to classify packets and/or perform filtering based on certain matching criteria, such as interface, protocol, source prefix, destination prefix, L4 port number, etc. The action for filtering can be either permit or deny, with or without statistics accumulation and/or reporting. CAR features are used to rate-limit traffic based on certain matching criteria, such as interface, IP precedence, quality of service (QOS) group, or ExACL criteria. CAR provides configurable actions such as transmit, drop, set precedence, or set QOS group, when traffic conforms or exceeds the rate-limit. Network data flow statistics features include both: (1) the ability to separate or identify a specific flow or group of flows and (2) operate on those flows in some manner, e.g., gather desired statistical information. In general, a "flow" is a series of data packets transmitted between two points in a network during a session. Such network data flow information might be used for network planning, traffic engineering, or even billing purposes. In one embodiment of the present invention, flow data is presented as a multi-dimensional table. For each entry in the table, the table usually keeps count of the number of bytes, packets and individual flows which matched that entry, as well as timestamps of the oldest and most recent packets seen. In another embodiment, a subset of this called "aggregated netflow," meaning only the bytes and packets are counted per table entry (timestamps are typically retained), is implemented. A router collecting netflow information periodically exports a netflow record (packet) which contains the contents of one entry of the table. These exported packets are then collected by a management workstation with appropriate software to summarize and report it.

Figure 1:
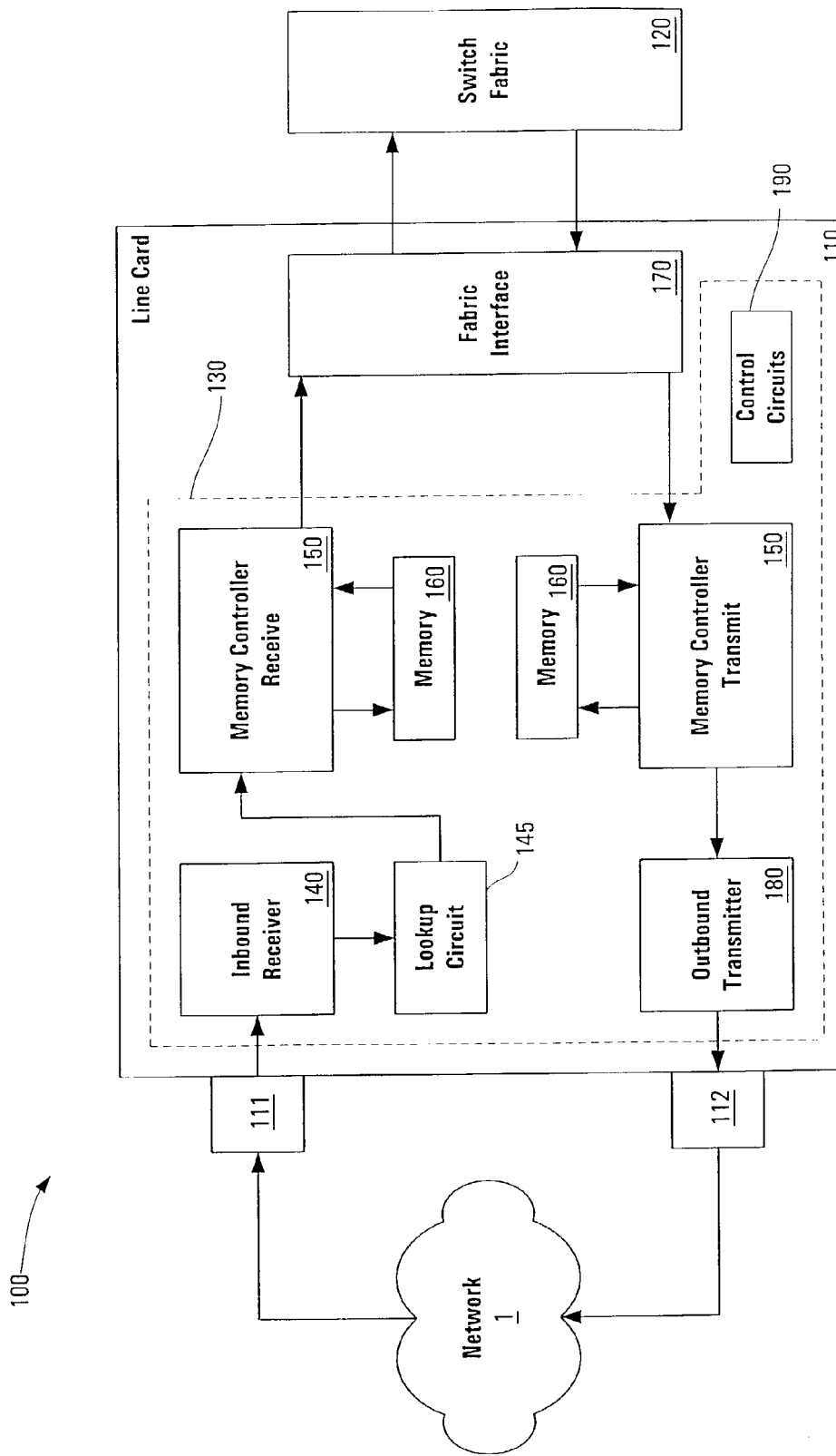
FIG. 1 is a high-level schematic representation of a switch system that contains prior art circuitry for the circuit/process of routing information packets.
Figure 2:
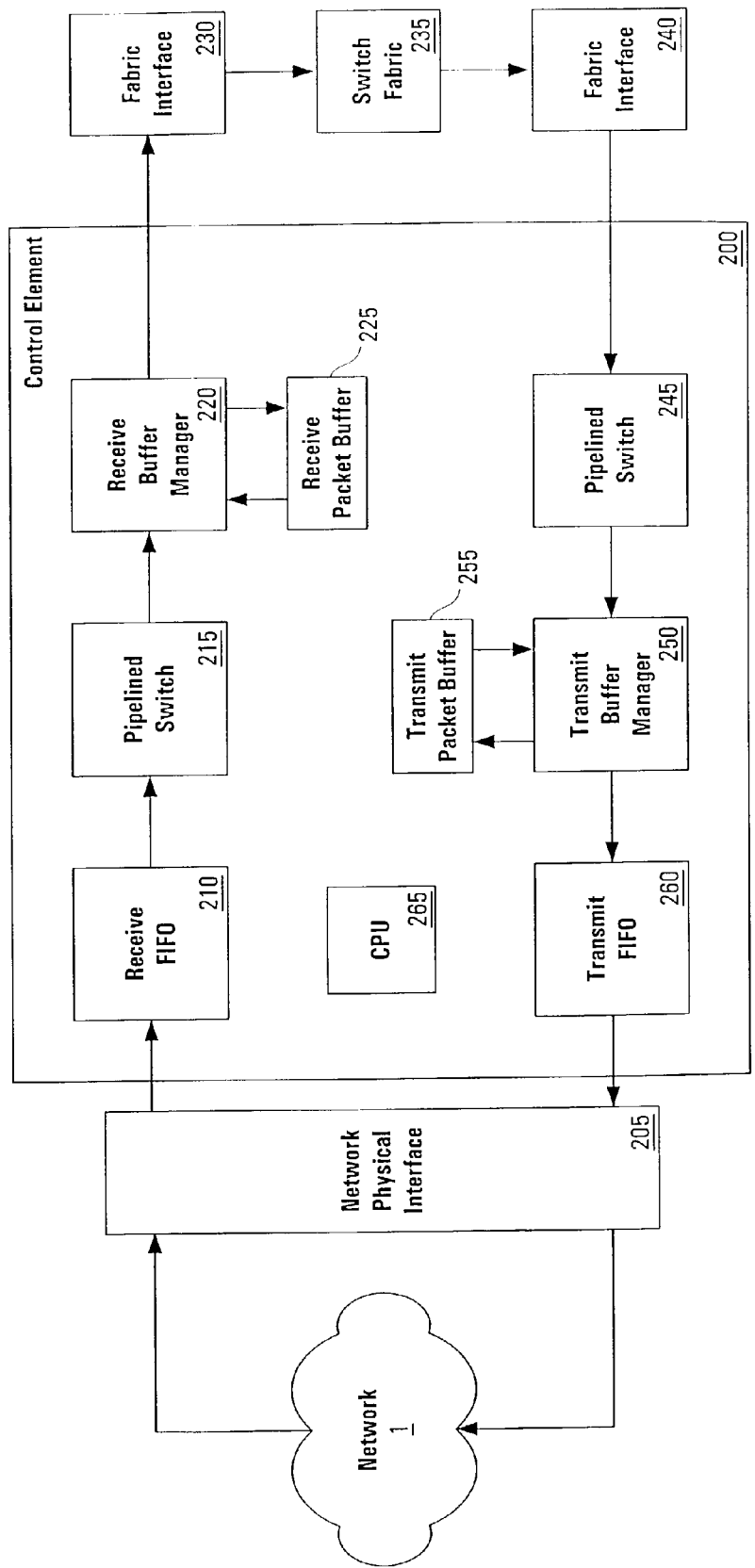
FIG. 2 is a high-level schematic of linecard control element 200 according to one embodiment of the present invention.

The linecard architecture of the present invention consists of distinct receive and transmit datapaths. Each datapath is independent and operates on a stream of packets received from network 1, as shown in FIG. 2. The receive side datapath is defined as the path from network physical interface 205 to the router's switch fabric 235. The transmit side datapath is defined as the path from the switch fabric 235 to network physical interface 205.

Information packets are received from network 1 through network physical interface 205. This interface can take any form depending on the physical medium of network 1. In one embodiment of the present invention, network 1 reaches the switch on a SONET optical fiber. Thus, network physical interface 205 provides optical to electrical conversion, clock recovery, serial to parallel conversion, framing, payload extraction, packet delineation, and packet multiplexing by means well-known in the art.

Although subsequent sections describe an optical fiber medium and (in particular) the OC-48 medium and encapsulation standard and the IP and TCP transport protocols, those skilled in the art will recognize that framing/encapsulation schemes and media other than OC-48, including those with higher or lower speeds such as OC-12, OC-192, SDH, packet over SONET, and ATM framing/encapsulation schemes. Copper (wire) or fiber optic media can be used. Likewise, protocols other than TCP/IP can be used such as UDP or ATM. Accordingly, the present invention is not limited to any particular type of media or protocol. The present linecard architecture is concerned with the processing of the received packets after they are reconstituted from the medium used for network 1.

Also note that while the specific discussion herein relates to Internet Protocol version 4 (IPv4), nothing in the present invention is limited to an IPv4-only implementation. The present invention can also be practiced in connection with the forthcoming IP version 6 (IPv6). Furthermore, although routing/switching of IPv4 packets is described, the present invention is equally applicable to forwarding of Multi-Protocol Label Switching (MPLS) labeled packets (also sometimes referred to as "TAG switching") and other protocols known in the art.

Figure 3:
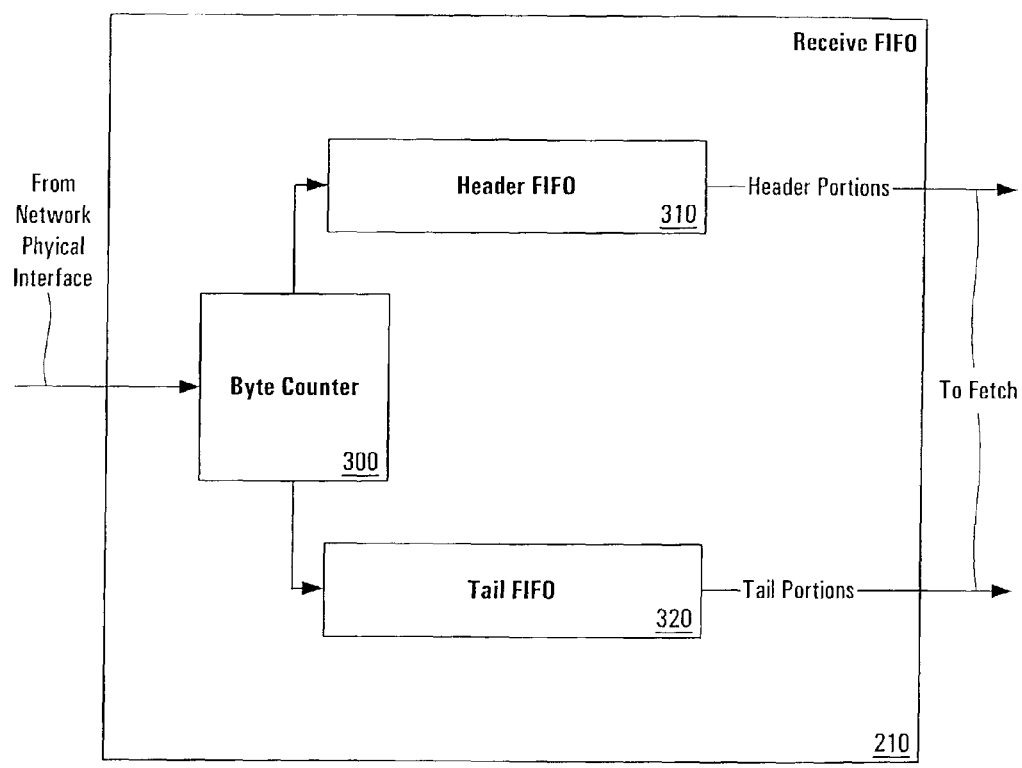
FIG. 3 is a high-level schematic of receive FIFO 210 according to one embodiment of the present invention.

The packet initially enters linecard control element 200 at receive FIFO 210. Receive FIFO 210 can be a separate element of linecard control element 200, or a portion of a physical layer interface module. This FIFO buffer is employed to absorb bursts of small packets which arrive while the pipeline is not moving fast enough to keep up with the data flow. Additionally, receive FIFO 210 allows control element 200 to process packets from multiple input interfaces (not shown) associated with network physical interface 205. Referring to FIG. 3, each of the incoming packets are separated into a header portion and a tail portion by byte counter 300. Receive FIFO 210 comprises two logically distinct FIFOs. Header portions typically defined as the first n bytes of the received packet, are placed in header FIFO 310. The value of n can be increased as appropriate to allow deeper analysis into the packet. The balance of the packet, i.e., bytes n+1 through the end of the packet, are placed in tail FIFO 320. Here the term "header portion" refers only to the first n bytes of the packet and is not synonymous with the packet header defined as part of a packet protocol. The length n of the header portion is typically selected so that it includes the entire protocol header for the types of packets expected on in the device.

The receive datapath is pipelined in pipelined switch 215 (FIG. 2) by breaking the processing down into small components of the overall processing task for each packet. Each pipeline stage works on a different packet header portion to perform different tasks. When the operations of all stages are complete, each stage passes its results on to the next stage at the same time. In the receive path, for example, the first stage reads in a new header portion from receive FIFO 210. Once that header portion has passed through all pipeline stages, the last stage sends the now modified header portion on to the receive buffer manager 220. At the same time earlier and later received packets are simultaneously traveling through the pipeline stage by stage.

As the header portion moves through the stages of pipelined switch 215, various components of the switching decision are made, including updating the appropriate fields in the IP header (e.g., TTL and CHKSUM) and prepending a buffer header (BHDR) to the header portion. BHDRs store information about the packet for use by various stages of pipelined switch 215 and/or any of receive buffer manager 220, pipelined switch 245, and transmit buffer manager 250. The BHDR is organized such that when the header portion eventually leaves the last switching stage of pipelined switch 215 it is ready to be written, along with its corresponding tail portion, into the receive buffer memory and sent through the switch fabric to the destination output card.

Pipelined switch 215 operates on a relatively constant latency per packet switching decision (e.g., 250 ns, allowing for 4 Mpps throughput). As packets can be received from an OC48 interface at an instantaneous rate faster than this latency, the header/tail FIFOs also serve the dual purpose of being a burst buffer and smoothing the flow of packets into pipelined switch 215. The flow of header portions from the header FIFO, through pipelined switch 215, to buffer memory is independent of the flow of tail data from the tail FIFO to the buffer memory, as will be seen below. Since there is typically no substantial buffering for completed header portions coming from the output of pipelined switch 215, the appropriate buffering circuit (e.g., receive buffer manager (RBM) 220 in the receive path and transmit buffer manager (TBM) 250 in the transmit path) will accept them directly into the buffer memory. This operation will stop the flow of tail data for that time, and there is no implied relationship between the current packet being transferred over a tail bus and the header portion being transferred from the pipelined switch 215 to the buffer memory.

There is only very limited feedback from one pipeline stage to the previous, except for the handshake of passing packets forward from stage to stage. In one embodiment of the present invention, this is a self-adjusting system where there is no fixed packet shift clock. Instead, stages shift in synchronization with each other when all stages have completed their respective work. In an alternate embodiment, synchronization is provided by a common packet shift clock. The speed at which packets are passed from one stage to the next is the net rate that is achievable for that path of the linecard.

Figure 4:
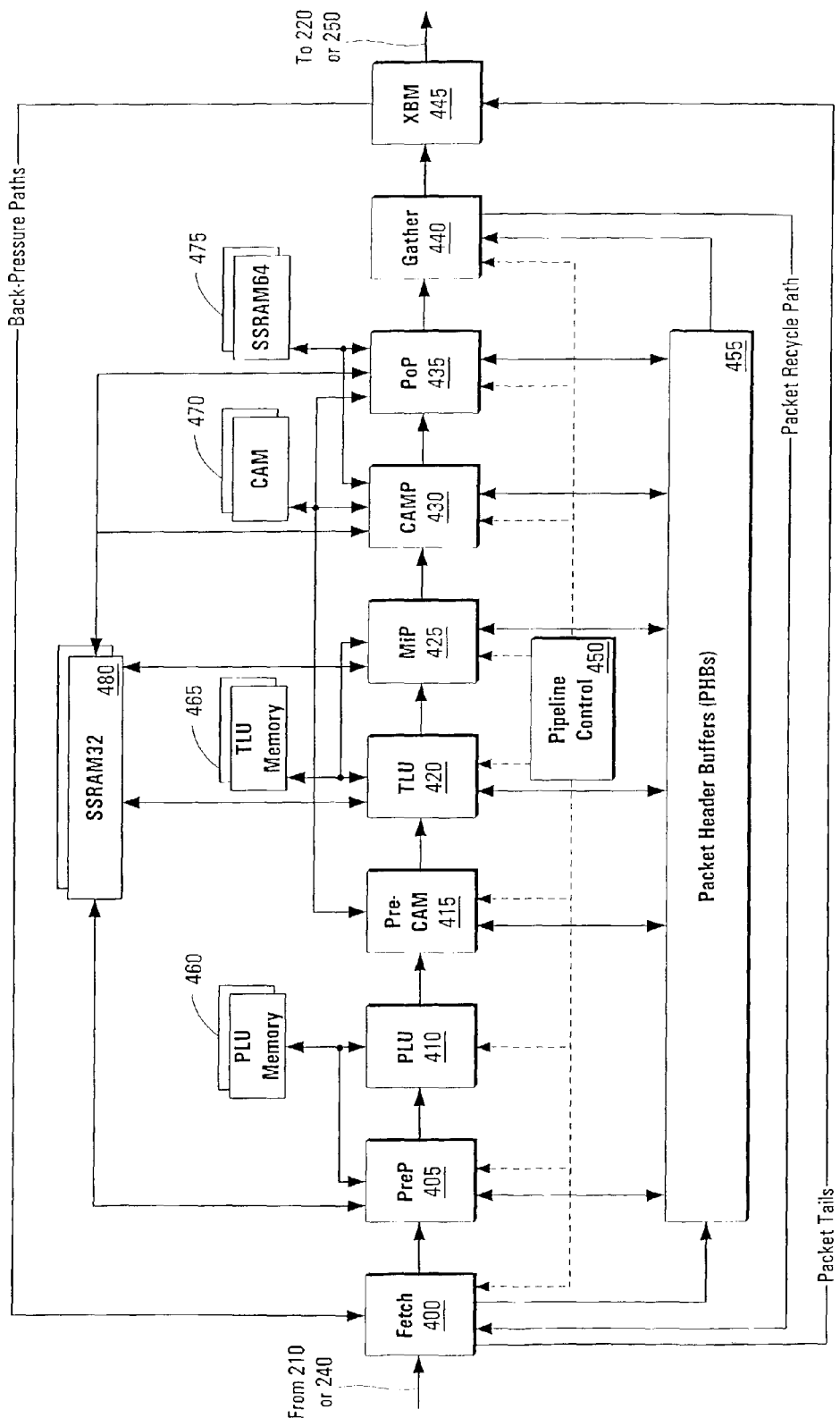
FIG. 4 is a high-level schematic of pipelined switch 215 or 255 according to one embodiment of the present invention.

Pipelined switch 215, shown in FIG. 4, is comprised of the following stages summarized below. These circuits, executing in sequence on a given packet, form the heart of the receive or transmit datapath.

Fetch Stage 400: Provides the physical transmission of the header portion from receive FIFO 210 into pipelined switch 215. As the data arrives, various packet checks and classifications are performed such as: MAC header checking, protocol ID checking, IP header checking, and extraction of IP/MPLS address fields. The results of these checks are made available to the next stages.

Pre-Processor Microsequencer (PreP) Stage 405: This is a microcoded stage which is capable of any general purpose activity on the packet. It is typical for it to perform duties such as processing the packet sanity checks done by fetch stage 400, classifying the packet's protocol type, unicast/multicast, setting up any per-interface or sub-interface processing required for the packet, and dealing with any exceptions (TTL expiry, IP checksum error). PreP 405 sets up the actions to be taken by the subsequent "non-intelligent" stages.

Pointer Lookup (PLU) Stage 410: This is an Mtrie lookup engine. PreP 405 passes it both a base address and a lookup key (typically IP address or MPLS label) and this stage walks an Mtrie data structure in the PLU SDRAM memory, ultimately returning a final pointer, e.g., a "leaf."

Pre-Content Addressable Memory (Pre-CAM) Stage 415: This stage performs accesses to TCAM 470 based on a profile selected by PreP 405. The results of these lookups are stored in the packet header buffer (PHB). This can potentially include changing the address from which TLU 420 continues its work.

Table Lookup (TLU) Stage 420: This stage begins with the final pointer from PLU stage 410 (or what Pre-CAM 415 modified it to be) and traverses the corresponding data structure in the TLU SDRAM. Ultimately, this results in various data entries being fetched into the PHB and various statistics being counted, e.g., per adjacency packets/bytes.

Mid-Processor Microsequencer (MiP) Stage 425: This is another microcoded stage (identical to the PreP) which is capable of any general purpose activity on the packet. It is typical for MiP to perform duties such as selecting the appropriate profile for the following (CAMP) stage, and thus which exact features are executed on this packet, e.g., ACLs, CAR, and Netflow.

Content Addressable Memory Processor (CAMP) Stage 430: The CAMP is the controller of the external TCAM. This module is actually three separate pipeline stages of the pipelined switch 215. CAMP 430 extracts various fields from the packet header, sends them to the TCAM, and interprets the results appropriately. The results from these lookups can be as simple as permit/deny, CAR token bucket maintenance, and aggregated netflow counter updates.

Post-Processing Microsequencer (PoP) Stage 435: This is another microcoded stage (identical to Prep and MiP) which is capable of any general purpose activity on the packet. PoP typically performs duties such as handling exceptions detected by previous stages, processing CAR rules which were not processed in the CAMP module, and programming the following stage (Gather) for the final appearance of the packet as it exits pipelined switch 215.

Gather Stage 440: This stage collects together the data elements which were brought into the PHB and formats them into the correct packet structure including: stripping the old input encapsulation, adding the new BHDR, stripping old MPLS labels if necessary, pushing new labels, and computation of the new IP checksum. Gather also provides the packet recycle path to Fetch 400.

Transmit/Receive Buffer Manager (XBM) Interface 445: This interface provides the appropriate interface to either the receive buffer manager (RBM) 220 in the receive path, or the transmit buffer manager (TBM) 250 in the transmit path, depending on where the pipelined switch is implemented, e.g. 215 or 245.

Further details of each stage circuit in pipelined switch 215 are discussed below and illustrated in FIGS. 5 through 14.

Figure 15:
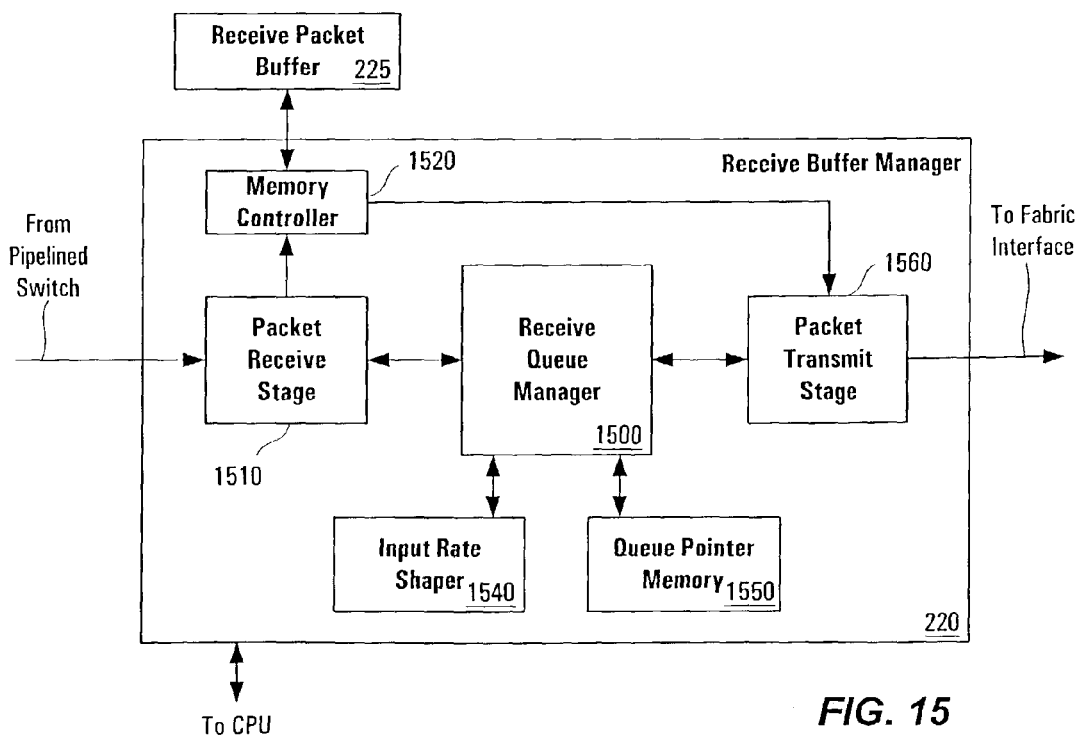
FIG. 15 is a high-level schematic of receive buffer manager (RBM) 220 according to one embodiment of the present invention.

Packets next enter receive buffer manager (RBM) 220, which is detailed in FIG. 15. As RBM 220 accepts each packet, it examines the BHDR which was prepended to the packet by pipelined switch 215 and picks a buffer from a free queue specified within one of the BHDR fields, as determined in a previous stage. RBM 220 fetches a buffer from that free queue and writes the packet header into that buffer (including the BHDR). If a packet is long enough to have a tail, RBM 220 also writes that data immediately following the corresponding header. Once the entire packet is finally written to buffer memory, the packet is enqueued to the local output queue specified in the BHDR.

The local output queue specified by pipelined switch 215, as indicated in the BHDR of the packet, can be one of two major types. For the first type, the packet can be put directly onto one of the output queues for the system. These queues are allocated for specific destination linecard slots, ports, class of service (COS) or other reasons. Packets are serviced from the output queues and sent to switch fabric interface 230 via a bandwidth sharing scheme. In one embodiment of the present invention, the bandwidth sharing scheme is a modified deficit round robin (MDRR) scheme, discussed below.

The second type of queue on which pipelined switch 215 can choose to put the packet is an input shape queue. These special queues have attached programmable "leaky bucket" hardware which controls the rate at which packets are removed from the queues. If a packet is put onto an input shape queue then it will stay there until it is considered time for the packet to be moved onto its final output queue. A common application for this structure is to put all the traffic arriving from a particular interface onto a certain input shape queue. This allows the system to throttle (i.e., rate shape) the amount of traffic which that interface can inject into the network.

In one embodiment of the present invention, both types of queues implement a congestion avoidance algorithm to manage the queue depth/latency. Examples of such algorithms include the random early detection (RED) algorithm and the weighted RED algorithm, discussed below, which ultimately determine if a packet should be enqueued as requested, or dropped. Packets which have some exception condition (e.g., errored packets, packets of a type that pipelined switch 215 is not configured to process, or packets for which pipelined switch 215 cannot make a fast switching decision) are flagged to be either dropped by RBM 220 or queued onto a slow path queue serviced by some other portion of control element 200 and/or other portions of the linecard, e.g., when additional packet processing is desired.

From fabric interface 230, the packets enter switch fabric 235 and are connected directly to another device linecard (not shown) which may be the same type of linecard or a different one.

As part of the transmit path, packets arrive from switch fabric 235 to fabric interface 240 and are forwarded to control element 200. In one example, packets arrive from fabric interface 240 in the form of specialized cells. The cells for a given packet are usually received in strict order and only one packet from each other linecard can be received at a time. Cells can be simultaneously received, i.e., interleaved, from multiple different linecards. Since the source slot number for each cell is usually known from the cell's header, packets can be easily reassembled.

FIG. 2 illustrates an optional second pipelined switch 245 in the transmit path. In general, pipelined switch 245 is a second instance of pipelined circuit 215 used for output services. However, because pipelined switch 245 is located in the transmit path, it might perform some tasks not performed by pipelined switch 215. Additionally, since control element 200 can be part of a linecard that is used with a variety of other types of linecards, packets arriving from fabric interface 240 may not have been subjected to the rich set of switching features available to those packets traversing pipelined switch 215. Thus, by placing pipelined switch 245 in the transmit path, many of those features can still be utilized. As noted above, use of pipelined switch 245 in the transmit path is optional. While some embodiments of the present invention will include pipelined switch 245, others may not.

For example, in the embodiment illustrated in FIG. 2, pipelined switch 245 observes the cells as they arrive from fabric interface 240 and intercepts the first few cells of each packet. These cells can be concatenated into a header portion and flow through pipelined switch 245 allowing various output features to be performed, such as committed access rate (CAR) and extended access control lists (Ex-ACLs). Alternately, fabric interface 240 might reassemble cells into packets for processing by pipelined switch 245. These features can also include further modification of the header portion, such as changing the type of service (TOS) or changes in the BHDR. As these "header" cells are travel through pipelined switch 245, the corresponding "tail" cells are stored in an internal FIFO. This is so the cells for each packet are still sent to transmit buffer manager (TBM) 250 in the correct order.

When used in both paths, the pipelined switches 215 and 245 can cooperate in performing certain switch/routing tasks. For example, initial packet processing might occur on a packet as it is received and passes through pipelined switch 215, while subsequent but related processing might occur as the packet passes through pipelined switch 245. Thus, when the two pipelined switches are used cooperatively in both the receive and transmit paths, a packet switching/routing pipeline is effectively formed across the switching fabric, i.e., the switching fabric is "inside" the pipeline. This architecture can provide a variety of advantages including, for example, distributing a processing load across the two pipelined switches and providing pipelined switch services to packets from linecards that do not posses a similar pipelined switch in their receive paths.

Whether or not pipelined switch 245 is included in the transmit path, TBM 250 receives the cells. The cells are reassembled into packets inside buffers in the transmit packet buffer 255. Alternately, as noted above, fabric interface 240 assembles complete packets. The particular buffer size to use is typically specified by a field in the BHDR sent from the source linecard. The completed packets are then queued onto an output queue according to another field of the BHDR. These output queues have special bandwidth sharing hardware which controls the logic which services them. As above, the output queue is determined at least in part by the COS required by the packet. These output queues also run a congestion-avoidance algorithm as mentioned above. Packets can also be specially queued if there is some exception condition.

Outbound (transmit) packets are serviced from these output queues via a bandwidth-sharing algorithm such as MDRR. In the process, packets have their output encapsulations added as the packet is read from transmit packet buffer 255. Transmit FIFO 260 is between the TBM 250 and network physical interface 205 to absorb bursts of packets and keep the utilization of the media links as close to 100% as possible. In a typical implementation there is one FIFO per physical channel. Packets leave control element 200 through network physical interface 205, eventually leaving the control element and/or associated linecard for network 1.

The discussion below describes functional blocks and related elements of the present architecture in greater detail.

Returning to FIG. 3, once data from network 1 has been processed by network physical interface (NPI) 205, packets are transmitted to byte counter 300 of receive FIFO 210. The exact length of the received packet is indicated along with the packet header by NPI 205. The header portion of the packet is, in one embodiment, the first 64 bytes (i.e., n=64) as this is enough for pipelined switch 215 to make the appropriate switching decisions for TCP/IP and/or MPLS switching with PPP encapsulation. This value n (discussed above) is programmable and the present invention should not be construed to be limited to any particular header portion length. Other lengths may be found with experience to be better optimized for different protocols and encapsulations.

Receive FIFO 210 allows for more flexible processing in pipelined switch 215 by providing surge buffering. This buffering allows pipelined switch 215 to process different types of packets, taking more or less time as demanded by each packet's needs. Although illustrated as a separate component from pipelined switch 215, receive FIFO 210 can be incorporated into pipelined switch 215. For example, the functional portions of receive FIFO 210 can be included in fetch stage 400.

Receive FIFO 210 contains, in one embodiment, two logically separate FIFOs: one for the packet header portion (header FIFO 310) and one for the remaining part of the packet (if any), referred to as the tail or tail portion (tail FIFO 320). Note that this need only be a logical distinction; physically, there may only be one FIFO.

In an alternate embodiment of the present invention, receive FIFO 210 can be omitted (leaving only conventional circuitry such as byte counter 300 to separate the header portion from the tail portion) if the pipelined switch is fast enough to process the header portions under all circumstances without buffering.

In one embodiment of the present invention, the header and tail portions are multiplexed together by conventional means (not shown) in order to conserve interconnection pins between receive FIFO 210 and pipelined switch 215. On receipt in pipelined switch 215, header portions proceed into the pipeline while tail portions are sent directly to XBM interface 445. XBM interface 445, as will be discussed below, also conserves interconnection pins by multiplexing the post-pipeline processed header portions and tail portions for transmission to RBM 220.

In a further alternate embodiment, an additional surge protection FIFO is used in pipelined switch 215 to protect RBM 220 from being overloaded. This FIFO (e.g., tail buffer 1420 shown in FIG. 14) is placed on the tail portion line immediately before XBM interface 445 or included as part of XBM interface 445. The FIFO allows decoupling of the flow of header portions and tail portions through pipelined switch 215.

Returning to FIG. 4, the basic structure of pipelined switch 215 is illustrated along with associated resources. Pipelined switch 215 operates on a relatively constant latency per packet switching decision. Each stage in pipelined switch 215 operates on a different packet. When a stage completes its operation it signals to the pipeline control 450 that the operation has completed and waits for a start signal from the pipeline control. Pipeline control 450 waits until all stages have completed their operations before it signals to all the stages to start processing the next packet. Thus, while the starting point of the pipeline is synchronous across all stages, the period each stage operates is asynchronous thereby allowing some stages to use more time for processing as required.

In one embodiment of pipelined switch 215, there are fifteen packet header buffers (PHBs) distributed among the various stages of pipelined switch 215. These are collectively illustrated as PHBs 455 in FIG. 4. Each incoming packet is associated with a PHB, which contains the header portion as well as other switching information which is written into the PHB by the different stages of the pipeline. In one example, each incoming packet is associated with a PHB by a unique pointer to that PHB. These pointers are passed from stage to stage, rather than physically moving the PHBs or copying the data therein. At any given point in the pipeline, each stage of the pipeline operates on a different PHB. In addition to the PHBs, there are a number of registers called packet associated information registers (PAIR). Some of these registers move throughout the pipeline, and some are needed only between certain stages—sequential or not. Each of the PAIR registers is initiated in one or more stages and is used in one or more stages along the pipe. Among the PAIR registers are several subsets of registers including packet control registers (PCR) and packet information registers (PIR). The PAIR registers can also include lookup FIFO memory, or separate lookup FIFO memory registers can established at one or more locations in the pipeline so that lookup information can move through the pipeline as needed. The PIRs propagate information about the packet to be used for normal fast path processing. The PCRs, by contrast, only propagate control and exception information. Normally, the PCRs are empty (all zeros). Flags in the PCRs are only set if an exception or error condition is encountered in a stage; the flags are then propagated in the PCRs down the pipeline. PAIR registers and PHBs can be logically separate portions of the same physical memory, or may be formed from physically separate memories.

Collectively, these registers are used to transfer control information among the stages informing the required operation. Some other registers are streaming with the pipe, to support the need of communication between the stages, which can not be accomplished by the PHB. As each stage completes its operation on the current packet, it sends an end signal to pipeline control 450. Pipeline control 450 provides control on starting each next stage of the pipe, as well as control for single stage operation of the pipeline for debugging. The pipeline control is also responsible for the PHB access management.

Although typically not part of the same integrated circuit as pipelined switch 215, memories 460, 465, 470, 475, and 480 are used in conjunction with pipelined switch 215 to support the switch's numerous features.

PLU memory 460 is typically implemented using synchronous dynamic random access memory (SDRAM) having, for example, a 72 bit data path and storing tables of pointers such as an mtrie structures. TLU memory 465 is also typically implemented using SDRAM having, for example, a 72 bit data path. TLU Memory 465 typically stores data structures that are accessed using the pointer derived from PLU memory 460.

Content Addressable Memory (CAM) sub-assembly 470 is a specialized memory structure particularly useful for implementing many of the edge functions of pipelined switch 215 because of the CAM's speed. Content addressable memories (CAMs) differ from a regular memories in that instead of providing an address to the memory which in turn produces the data from that address, a CAM does the opposite. A CAM is presented with data and then searches through its memory until it finds an address which contains that data. CAMs are useful in part because data locations in memory are searched in parallel so the search time is very fast-whether a match is found near the start of the memory, near the end of the memory, or not at all. In one embodiment, CAM sub-assembly 470 utilizes a Ternary Content Addressable Memory (TCAM). A TCAM differs from a CAM in that each bit stored can have one of three values. Instead of each value stored being a series of 1s and 0s, a third state of X (do not care) is allowed. Thus, if the memory contains the entry 10XX and the search key is 1011, entry 10XX will be considered a match. TCAMs typically return the first match even if there are multiple matches. While TCAMs are preferably used with pipelined switch 215, those having ordinary skill in the art will readily recognize that a variety of different CAM structures can be used. Moreover, a variety of different architecture optimizations can be implemented using different CAM structures.

Figure 4A:
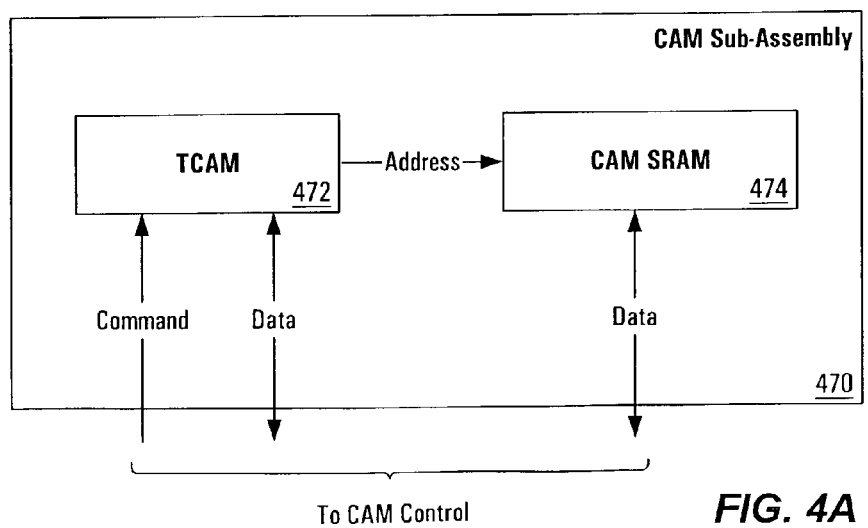
FIG. 4A is a high-level schematic of the content addressable memory subassembly according to one embodiment of the present invention.

FIG. 4A illustrates one possible implementation of CAM sub-assembly 470. CAM sub-assembly 470 includes TCAM 472 and CAM SRAM (CSRAM) 474. When one of the stages of pipelined switch 215 accesses TCAM 470 via, for example, CAM controller circuitry, the stage passes a data value to CAM 472. If the data value is matched with a value stored in CAM 472, a corresponding address is sent from CAM 472 to CSRAM 474. CSRAM 474 then provides the corresponding data word to the appropriate stage of pipelined switch 215.

In general, there are several different basic types of TCAM entry. Each has a field indicating the type, including, for example, values for: ACL, CAR, Netflow, statistics-counter, and MAC compression. Additionally, each TCAM entry can have a field which indicates the width of that entry, e.g., 72, 144 or 288 bits. Note that both the type and width as well as the general format of the TCAM entries is software configurable, allowing maximum flexibility.

In one embodiment of the present invention, TCAM 472 entries contain data matched against different portions of the packets. TCAM 472 is divided into ACL (filtering) entries, CAR entries, aggregated netflow entries and others. A match for any of those entries causes the address of this entry to be sent to CSRAM 474. The content of this address in CSRAM 474 is read by pipelined switch 215 and has the following fields:

If the matched CAM entry is ACL, then CSRAM 474 has a permit or a deny indicator for the packet, and an optional pointer to the statistics corresponding to this entry in SSRAM64 475.

If the matched CAM entry is CAR, then CSRAM 474 has a pointer to the token buckets, and optionally to the statistics of this CAR entry in SSRAM64 475.

If the matched CAM entry is netflow, then CSRAM 474 has a pointer to the statistics for this entry in SSRAM32 480.

If the matched CAM entry is other, then CSRAM 474 has a compressed value for this entry.

Pipelined switch 215 typically reads CSRAM 474 and accesses SSRAM32 480 and SSRAM64 475 via different interfaces. Those having ordinary skill in the art will readily recognize that a variety of different types of information can be stored in TCAM 470 for use by pipelined switch 215.

Examples of CAM related systems and CAM implementations can be found in U.S. patent application Ser. No. 09/974,296, filed Oct. 4, 2001, entitled "Method and Apparatus for Dynamically Generating Lookup Words for Content-Addressable Memories," naming Eyal Oren and David Belz as inventors; U.S. patent application Ser. No. 10/077,243, filed Feb. 14, 2002, entitled "Method and Apparatus for Matching a String with Multiple Lookups using a Single Associative Memory," naming Eyal Oren and David Belz as inventors; and U.S. patent application Ser. No. 10/042,836, filed Jan. 8, 2002, entitled "Method and Apparatus for Implementing and Using Multiple Virtual Portions of Physical Associative Memories," naming David Belz and Eyal Oren as inventors. These patent applications are incorporated in their entireties herein by reference. SSRAM32 480 is a synchronous static random access memory (SSRAM) having a 32 bit wide data path. This memory is used by a variety of stages to store different values and data structures including, for example, mtrie pointers, load balance (LBL) values, and aggregate flow statistics. Similarly, SSRAM64 475 is a synchronous static random access memory having a 64 bit wide data path. This memory is used by several stages of pipelined switch 215 to store different values and data structures including, for example, CAR and ACL statistics, CAR buckets, and data from PoP stage 435.

For each of the memories 460, 465, 470, 475, and 480, those having ordinary skill in the art will readily recognize that a variety of different types, sizes, and speeds of memory can be used in place of those described above. Moreover, two or more of memories 460, 465, 470, 475, and 480 can be implemented using a single physical and/or logical memory structure. Additionally one or more of the memories can include or be combined with control logic configured to perform additional functions such as arbitrate among multiple clients of the memory and perform basic operations such as addition and incrementation. For example, SSRAM32 480 can include sufficient control logic to increment certain counters stored in the memory, thereby obviating the need for some other circuit using SSRAM32 480, i.e., a client of SSRAM32 480 to perform the task.

Figure 5:
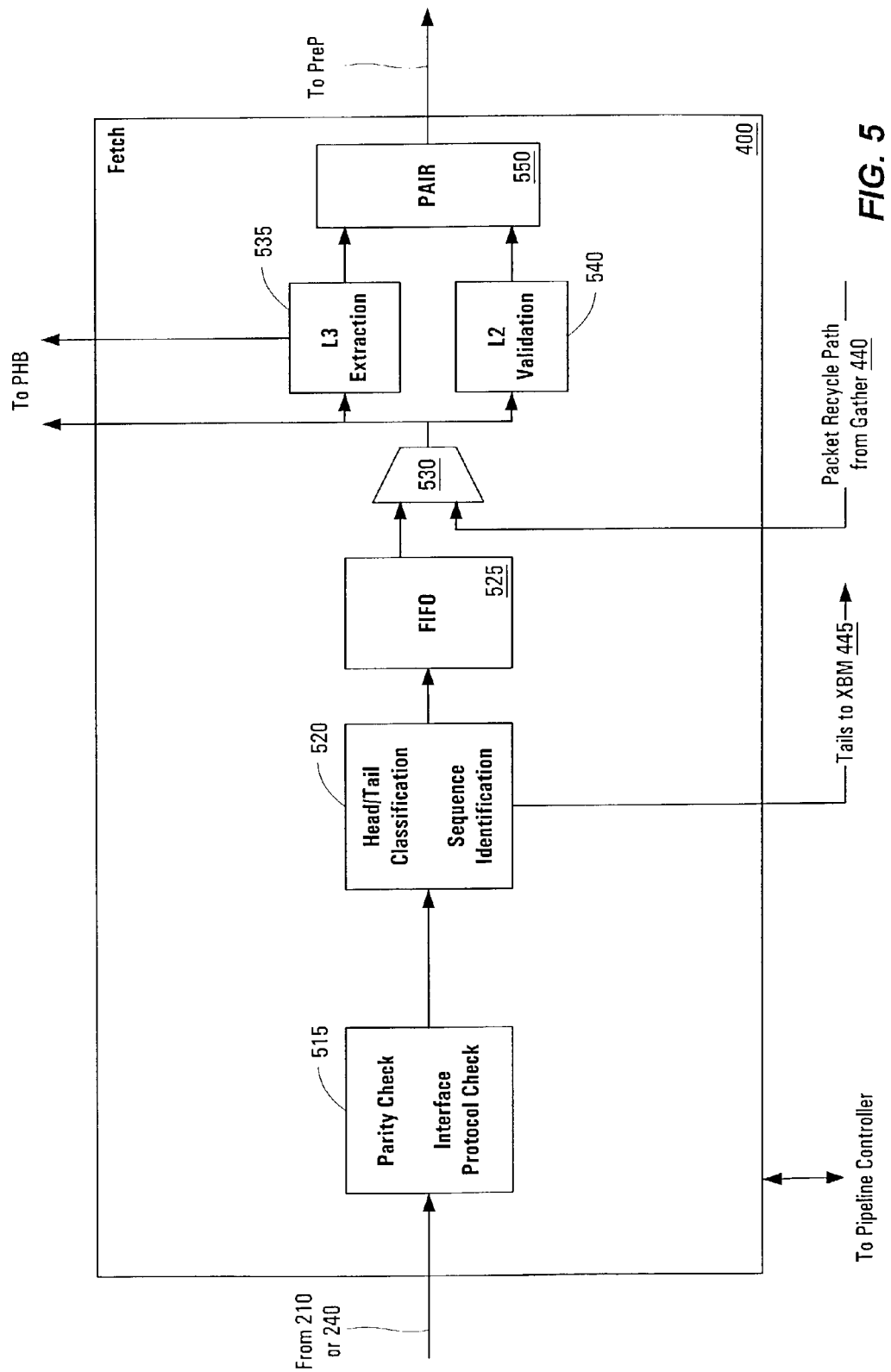
FIG. 5 is a high-level schematic of fetch pipeline stage 400 according to one embodiment of the present invention.
Figure 6:
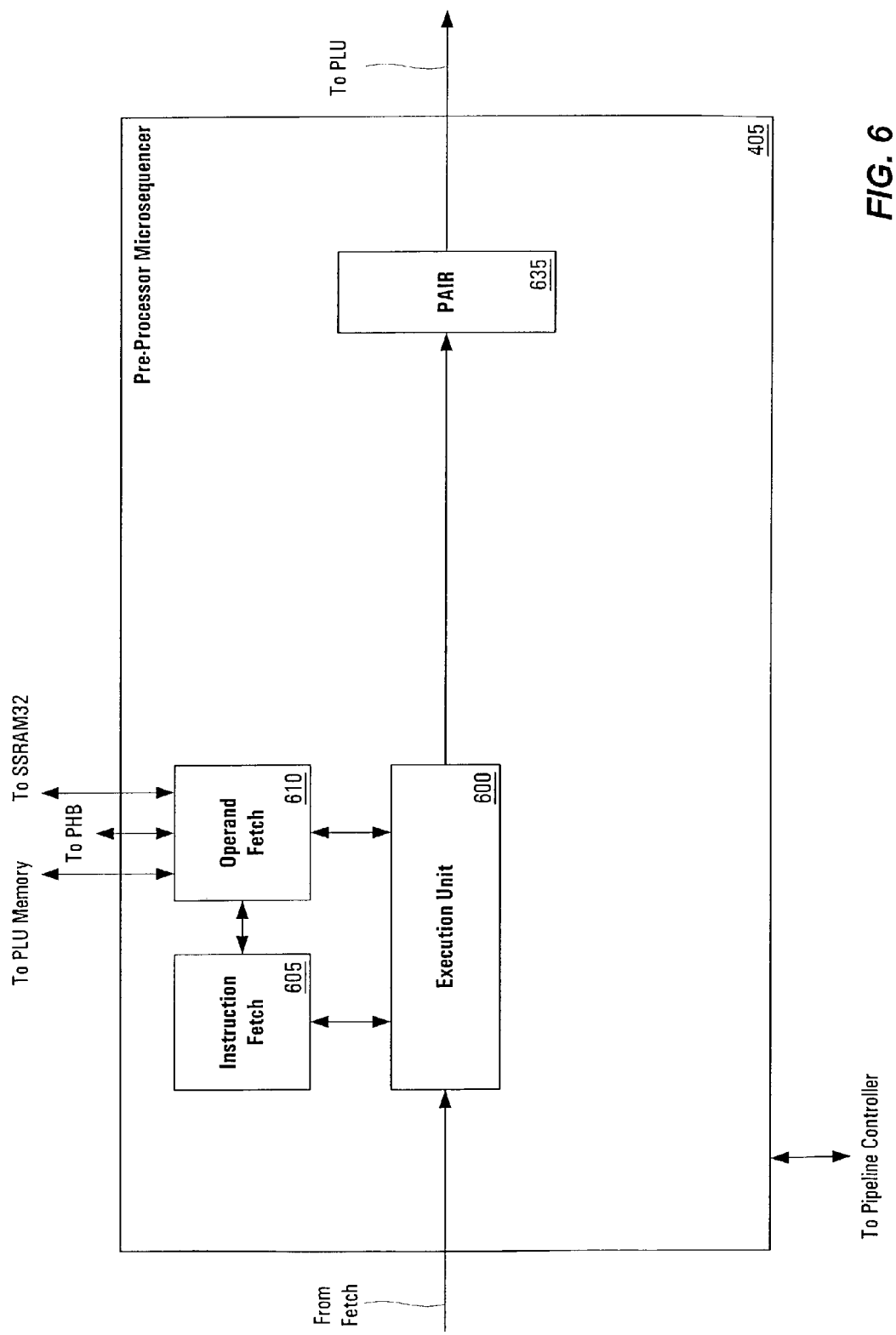
FIG. 6 is a high-level schematic of pre-processor microsequencer (PreP) pipeline stage 405 according to one embodiment of the present invention.

Header portions and tails from the receive FIFO 210 are fed into pipelined switch 215 beginning at fetch stage 400 as illustrated in FIG. 5. Fetch stage 400 accepts packets from either the previous receive FIFO 210 (when in the receive path) or fabric interface 240 (when in the transmit path), writing the header portion to a PHB and passing the tail portion on to XBM 445 without any further processing. When used in the receive path, fetch 400 expects a header portion to be a contiguous block of the packet, optionally including some amount of the original MAC encapsulation (at least the PID) and continuing into the TCP/IP header. When used in the transmit path, fetch 400 collects one or more cells of the packet into a PHB as the header portion. Remaining cells, if any, are passed around the pipeline as the packet tail. Sequence information (e.g., a timestamp, a sequence number, or some other identifier) can be added to the cells as they are received so that they can be sent to TBM 250 in the same order as they were received. Note that in the transmit path, the header portion can include a BHDR.

Fetch stage 400 receives the new packet words or the new cells from the previous block (210 or 240) and checks for exception conditions. Along with the header and tail portions, fetch stage 400 can receive packet length and channel number information (in the case of linecards having multiple input interfaces) from receive FIFO 210. These values are typically stored in PAIR 550. Receive FIFO 210 can also set a flag bit indicating whether the header portion being-passed has a corresponding tail portion. Exception condition tests performed by fetch stage 400 include parity check and interface protocol check 515. For example, an IP header checksum can be calculated in logic 535. In one embodiment of the present invention, the logic 535 determines that the packet is an IP packet with some number of bytes of MAC encapsulation preceding it and calculates the IP header checksum of the incoming packet accordingly. Based on the checksum calculation, logic 535 sets an indication in PAIR 550, e.g., within the packet control registers, if the checksum is correct or not. This result can be used by later stages such as PreP stage 405. If the packet is not IP, this checksum indication is not set. If the packet is IP and the checksum is incorrect, the packet is usually discarded.

Next, header portions and tails are separated by classification and sequence identification block 520. Here a sequence identifier, e.g., a sequence number or a timestamp, is typically associated with a header portion and the identifier is added to PAIR 550 so that XBM 445 can keep header portions in order. In both receive and transmit paths, tails are forwarded to XBM interface 445 described below. In the transmit path sequence information is used to coordinate header cell and tail cell arrival. Header portions then proceed to FIFO 525 which is used to buffer header flow through the pipeline and synchronize data flow between different clock domains, e.g. when different portions of fetch stage 400 operate at different clock rates.

Fetch stage 400 then processes data from one of two sources: new data from the network interface, or the recycle path. The recycle path typically has priority over the new data path since a recycled header portion stalls the following header portions in the pipeline until it passes through again. The decision to recycle a packet is typically made by PoP stage 435. When PoP 435 decides to send the contents of a PHB back through the pipeline, it initiates a recycle request. When a recycle indication is given, the data from the gather stage 440 is selected, according to a recycle interface, and driven into the fetch 400. Recycle multiplexer 530 is used to select the appropriate data source. From recycle multiplexer 530, the data passes to L2 Validation logic 540 and L3 extraction logic 535.

L2 validation logic 540 receives the header and checks the header's protocol identification (PID) field and its media access control (MAC) field. According to the values of those fields, L2 validation logic 540 extracts the encapsulation size, the type of the L3 packet (e.g. MPLS or IP), the thread for use by PreP stage 405, and whether or not L3 checks and information extraction should be performed.

The MAC encapsulation of the incoming packet is compared to a preprogrammed value for the channel (also known as the "interface") on which the packet arrived. The preprogrammed MAC encapsulation value is typically, but not limited to, 2 bytes wide to accommodate a variety of protocols, such as PPP and HDLC. This value is usually the first two bytes of the MAC header. L2 validation logic 540 assists in protocol identification by comparing the protocol field in the MAC header to a set of several preprogrammed values for each encapsulation and sets an indication to PreP 405 based on the protocol type of the incoming packet. In one embodiment of the present invention, there are several 16 bit protocol registers. CPU 265 programs these registers values which allow checking for specific cases including but not limited to: IP unicast over PPP; IP multicast over PPP; IP unicast over FR; IP multicast over FR; MPLS unicast over PPP; MPLS multicast over PPP; IP unicast over HDLC; IP multicast over HDLC; MPLS unicast over HDLC; MPLS multicast over HDLC; MPLS unicast over FR; MPLS multicast over FR.

For linecards with multiple inbound channels, each channel can be programmed to select only a subset of the protocol registers. Thus, when a packet comes in on a channel that has PPP encapsulation configured, it is compared only against the protocol registers which contain PPP protocol values. Packets which come in on channels with HDLC encapsulation configured are compared with protocol registers with HDLC values. Fetch 400 indicates to PreP 405 the protocol type found by setting the appropriate bits in PAIR 550.

The header portion is forwarded alongside with parameters extracted by logic 540 to the L3 extraction logic 535. This logic extracts the relevant L3 information, e.g., IP source and destination addresses, MPLS labels, and L4 parameters, e.g., TCP source and destination port numbers and other TCP flags, as well as performing validity checks on the L3 fields. The extracted parameters alongside with the results of the checks are forwarded on to other pipeline stages using the PAIR 550. For IP packets, some of the tests that can be performed by logic 535 include: a runt packet test verifying that there is sufficient size in the packet to hold an IPv4 header; an IPv4 "no options" test; an IPv4 header checksum test; and time to live (TTL) tests. For MPLS packets, some of the tests that can be performed by logic 535 include: TTL test; S bit test; null label test; null stack test; IP inside test (indicates an IPv4 header inside); IP "no options" test; runt IP inside test; and IPv4 header checksum inside test. Those having ordinary skill in the art will readily recognize that logic 535 and logic 540 can perform a variety of different tests and parameter extractions.

The next stage in pipelined switch 215 is pre-processor microsequencer 405. In one embodiment, PreP 405, MiP 425, and PoP 435 are three separate instantiations of the same microsequencer logic. The microsequencer logic serves as a programmable general purpose machine for header portion processing. The basic architecture of the microsequencer is a three stage pipelined execution flow. The stages are: instruction fetch and decode, operand fetch and branch evaluation, and instruction execution. For most operations the presence of the pipeline is transparent, but the results of any arithmetic operation (including the result flags) are not available for the instruction immediately following the instruction that set them.

Instruction fetch 605 reads program instructions from an instruction memory (not shown) and decodes the operation to be performed while keeping track of a program counter. The typical microsequencer instruction set includes jumps (relative and absolute addressing, conditional and unconditional), arithmetic logic unit (ALU) operations to an accumulator, transfers, and load/stores. The instruction set supports the functions of the ALU located within execution unit 600 including a barrel shifter, find-first-one logic, nibble masking, standard ALU operators (add, subtract, and, or, xor, not, and not, shift, compare), and multiply. Operand fetch 610 contains logic for reading and storing data from various memories external to PreP 405 including PLU memory 460, PHB 455, and SSRAM32 480, as well as internal register memory and operand registers. Execution unit 600 performs the arithmetic and logic operations of the microsequencer based on instructions and data (operands) supplied by instruction fetch 605 and operand fetch 610 respectively. Results from instruction execution are typically stored in PAIR 635, but can also be forwarded to other memories such as the PHB, SSRAM32, PLU memory, and/or TLU memory.

In one embodiment, PreP 405 is primarily responsible for analysis of the packet header. PreP 405 reads the packet header from the PHB and performs different types of analysis according to the packet type. The analysis can include completing the packet classification, preparing address fields that need to be looked up by following stages, and performing various checks and statistics accumulation on the packet. Specific PreP tasks include, but are not limited to:

Examine the MAC checking and protocol identification results from fetch stage 400.
   Fetching sub-interface control parameters and optionally maintaining statistics.
   If the packet is IP, examine the L3 header. If the L3 header is more than 20 bytes and is an IPv4 packet (i.e., it has options), the packet is forwarded to the linecard CPU.
   If the packet is IP, examine the results of the fetch stage checksum calculation or error indication.
   Check and calculate new values for the TTL field.
   Extract the addresses (for example, source IP address and destination IP address for IP) or label (for MPLS switching) and the COS and load them into the destination search registers (DSR) for use by PLU 410.
   Determine the appropriate base addresses and the first mask register values to use for each packet lookup and pass these to PLU 410. Different base addresses may be determined, in some embodiments, by the source interface, packet CoS, or other criteria.
   Provide other services, such as identifying multicast as well as support for load balancing, such as by calculating an appropriate hash value.

When the PreP 405 identifies an exception case in which pipelined switch 215 chooses not to forward the packet (e.g., TTL expired, checksum error, IP options), it sets the skip bits in the packet control register (within PAIR 635). This indicates to the following stages to skip operations. The packet is eventually passed to PoP 435, which decides how to continue with the packet based on the exception type.

All three microsequencers can also include CAM interface 615 enabling them to make use of CAM 470. Although PreP 405 and MiP 425 can be interfaced to CAM 470, since PreP 405 and MiP 425 do not typically make use of a CAM interface, the CAM interface and its functions will be discussed below with respect to their use in PoP 435.

Figure 7:
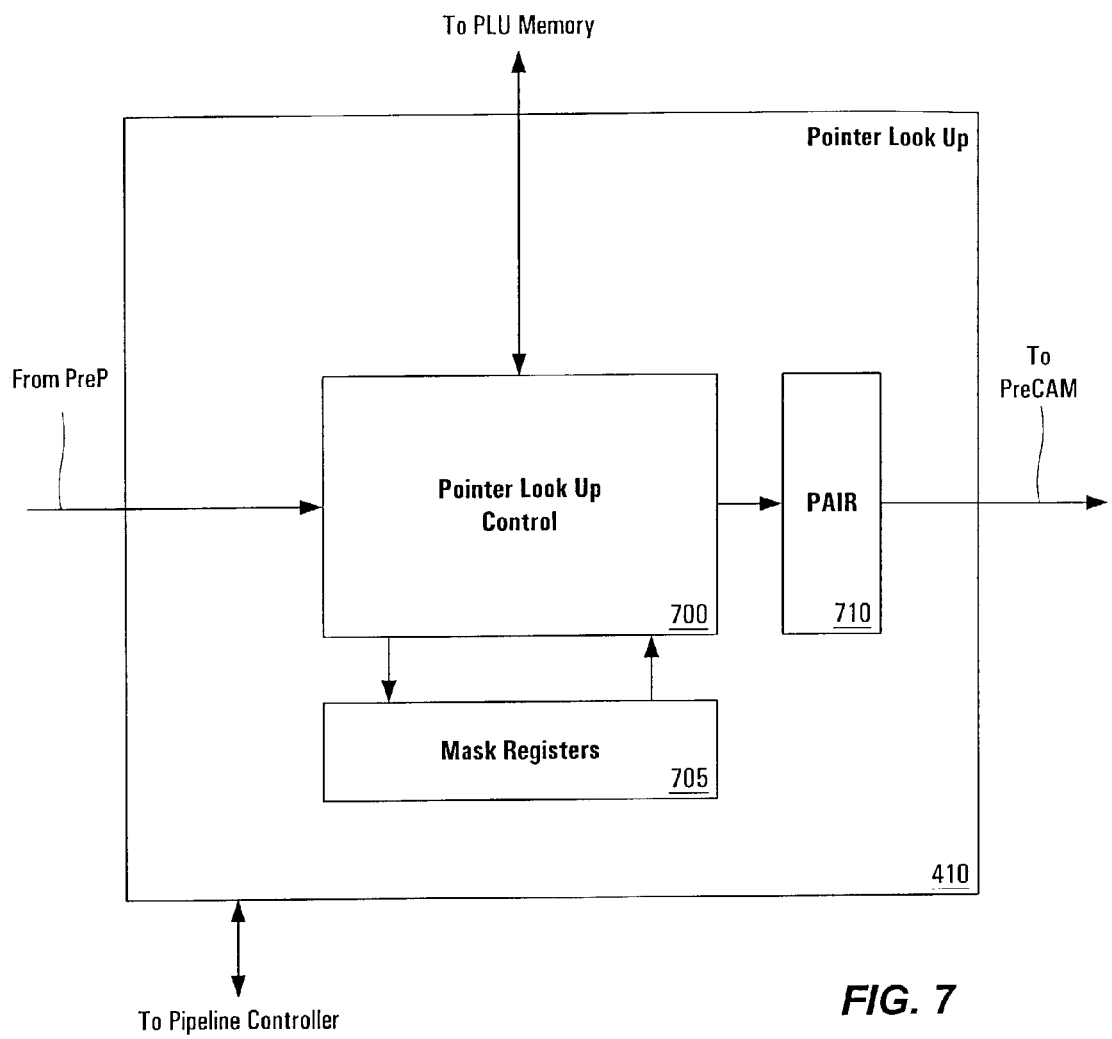
FIG. 7 is a high-level schematic of pointer lookup (PLU) pipeline stage 410 according to one embodiment of the present invention.

FIG. 7 illustrates PLU stage 410 which receives data from PreP 405 and is the next stage in pipelined switch 215. PLU 410 and TLU 420 are used to extract needed information from the forwarding information base (FIB) (not shown). The FIB is a database used to store the routing information needed by the linecard to forward packets. For example, when the FIB is a tree-based data structure, there are two basic components: the pointers (also known as nodes) used to navigate to the selected end-point, and the information itself which is found at the end-point (also known as the leaf). In general, the leaf can be much more complex than a simple data structure. In one embodiment, the FIB is split between two different memory systems attached to pipelined switch 215, namely PLU memory 460 and TLU memory 465. The first memory is generally for the 'pointers' of the tree. The second memory is for the leaves, adjacencies, load balancing tables, and possibly other structures. One advantage of splitting the FIB in this manner is that the lookup operation can be pipelined to allow twice as many packets per second. PLU 410 and TLU 420 can similarly be used to extract needed information from a routing information base (RIB) (not shown). RIBs typically contain more detailed route information.

One example of the data structure stored in PLU 410 is known as an mtrie. Mtrie structures are further described in commonly-owned, U.S. Pat. No. 6,308,219, ROUTING TABLE LOOKUP by John H. Hughes, filed on Jul. 31, 1998, incorporated herein by reference in its entirety.

PLU 410 performs indirect lookups using the value fetched from memory as a base pointer to calculate the next fetch and thus "walk" the mtrie. Alternatively, PLU 410 can perform a single lookup which could be used, for example, for MPLS switching. Typically, PreP 405 provides the data key to search from and the base address of the mtrie to search in along with a mask register pattern to use. In one embodiment, PLU 410 supports making two lookups in parallel, thus there are actually two sets of information which the PreP forwards if desired. Thus, PLU 410 is a programmable search engine whose operation is controlled by the values set in several different registers. The destination search registers (DSRs) (not shown) contain the data key being looked up, e.g., the IP destination, the MPLS label, the IP source, or another key. PLU 410 begins its search at a base address defined by the base address registers (BARs) (not shown). The BAR typically points to the root of an mtrie. PreP 405 writes the appropriate base address to use into the BAR, according to the packet type, and thus selects the tree to be searched (walked). Mask registers 705 define the portion of the address in the DSR which is to be used for the search in each search iteration.

For example: in an IP case, if the first mask register has the first 16 bits set (i.e., [31:16]), it determines that those 16 bits from the DSR will be used in the PLU stage to calculate the offset for the first search. The next mask register may have the next 8 bits ([15:8]) set which indicates that those 8 bits from the DSR should be used in the next iteration, and so on. For MPLS lookup, 20 bits (i.e., [31:12]), thus defining the entire MPLS label, could be set. Thus the number of bits in the DSR which are used on each search operation is programmable via the mask registers. There is a set of mask registers in PLU 410 that can be programmed to any mask value. PreP 405 provides the number of the first mask register. PLU 410 uses this mask register for its first memory iteration and then increments the mask register number and continues with the following mask register for the next iteration until it completes the search. The output value ultimately read from the terminal node of the mtrie tree is a leaf pointer which points to a data structure whose format is described by a field of the pointer itself. The leaf pointer is stored in registers within PLU 410, e.g., PAIR 710, whose values subsequently travel with the packet to the following stages.

A second function of PLU 410 is to perform a lookup to assist with load-balancing. The load balance process starts with PreP 405 loading an appropriate key into hash generator logic. Typically, this data would involve the IP source/destination addresses. The hash result is a 16 bit value. Thus, PLU 410 uses a simple lookup table in PLU memory 460 to help reduce the amount of logic and complexity required in the later TLU 420 stage.

Figure 8:
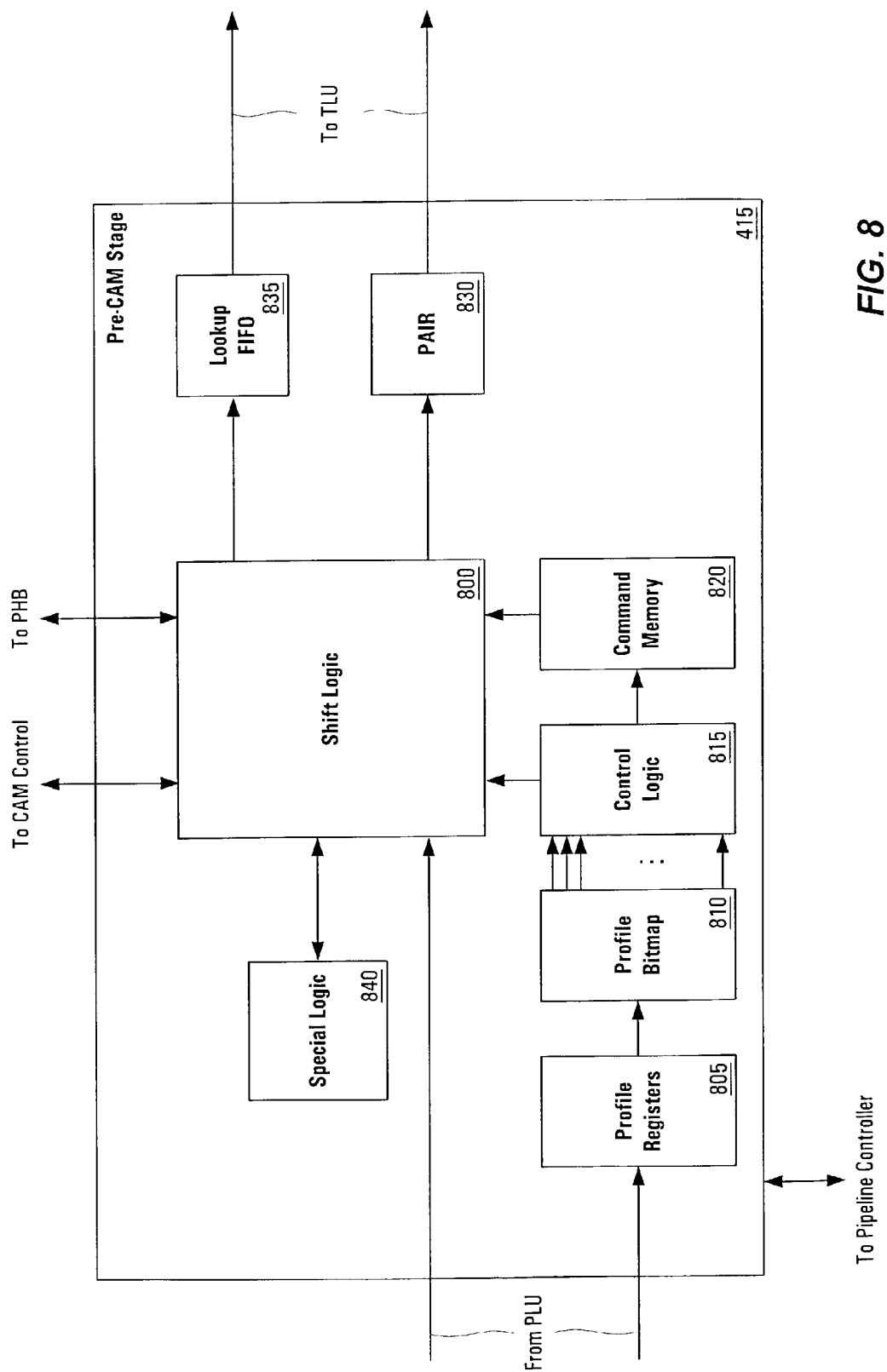
FIG. 8 is a high-level schematic of pre-content addressable memory (PreCAM) pipeline stage 415 according to one embodiment of the present invention.
Figure 9:
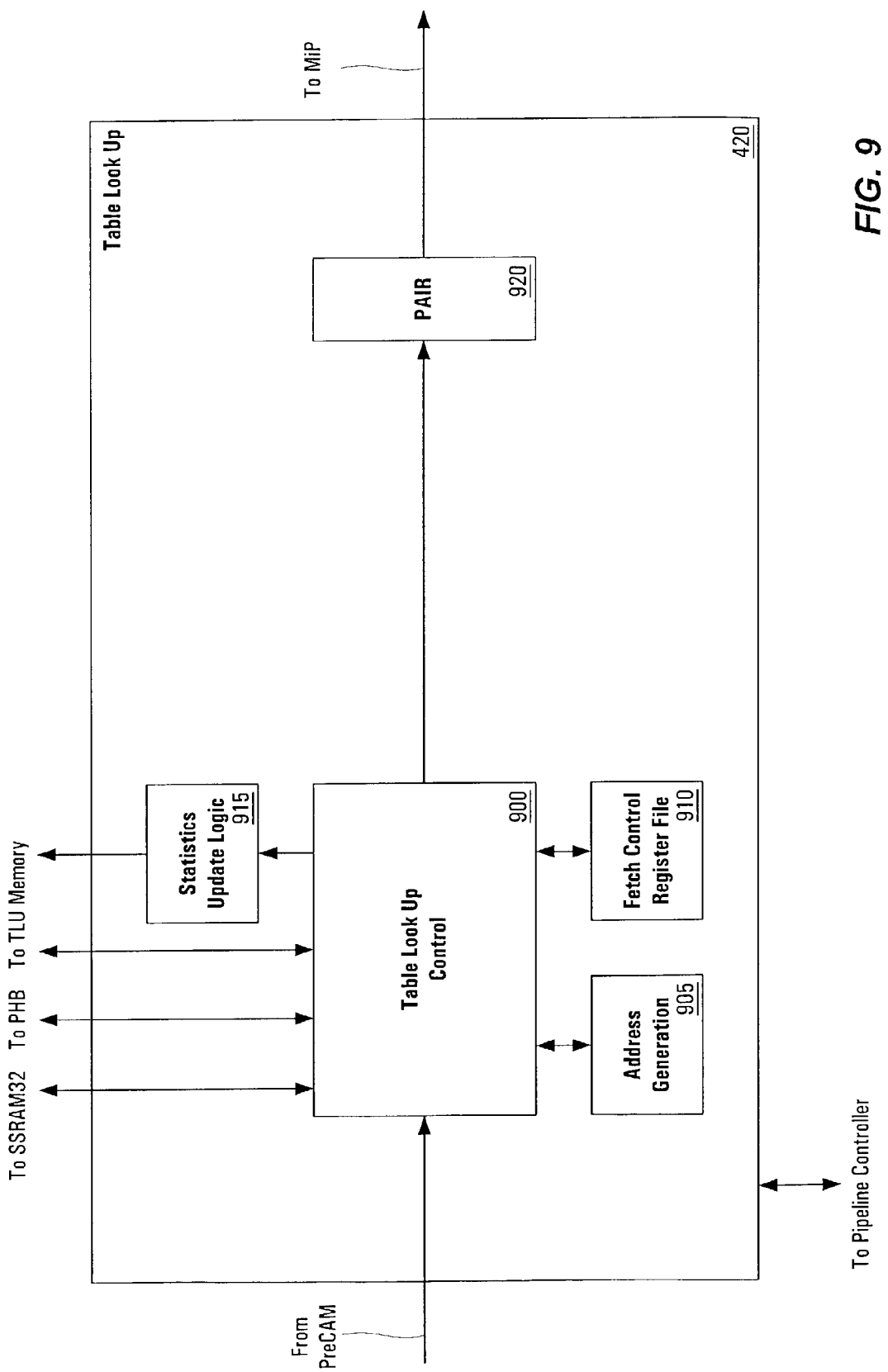
FIG. 9 is a high-level schematic of table lookup (TLU) pipeline stage 420 according to one embodiment of the present invention.
Figure 10:
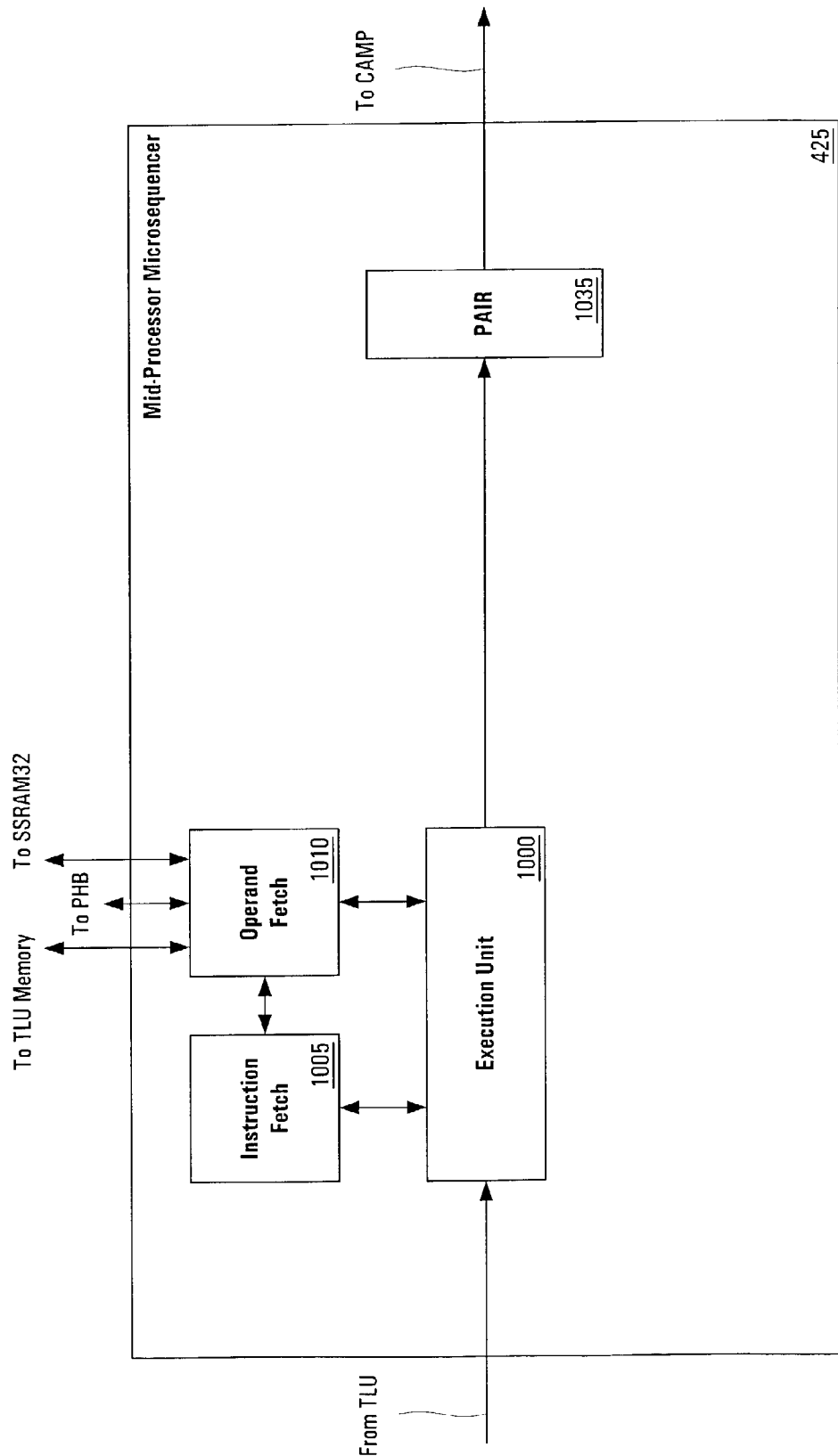
FIG. 10 is a high-level schematic of mid-processor microsequencer (MiP) pipeline stage 425 according to one embodiment of the present invention.

The next stage in pipelined switch 215 is PreCAM 415 as illustrated in FIG. 8. PreCAM 415 is a state machine that is pre-configured with a series of different profiles. Each profile describes a set of data fields taken from various places in the PHB or other data registers associated with the packet, e.g., results of the PLU lookup. Each profile entry represents the fields needed to concatenate together and issue to CAM 470 for processing a certain feature, e.g., ExACL, CAR, policy based routing (PBR), different flow statistics tables, etc. Typically, the profiles are programmed by the software at configuration time, but the selection of which profile entries to run for each given packet is a run-time decision made by PreP 405. This decision is typically made based on which interface/sub-interface the packet was received on, which protocol the packet uses, e.g., IPv4, MPLS, IPv6, or possibly other criteria. PreCAM 415 issues the appropriate CAM lookup requests for the current packet. In some cases, the data returned from CAM 470 can be used to overwrite information such as the leaf pointer (determined by PLU 410) for use by TLU 420. Alternately, the returned data can be used as data in a subsequent CAM lookup, e.g., for compressing MAC addresses. Other data returned during the CAM lookup operation performed by PreCAM 415 is stored for later processing by a microsequencer. This scheme results in the ability to implement features such as PBR where the result of the CAM lookup, e.g. the IP destination address and TOS field, will replace the result achieved from the PLU lookup of the previous stage. Another example application is to compress the incoming MAC address to make it then possible to implement (down pipeline) statistics or other features on the full data field without using a large CAM width.

An indication of the selected profile is stored in profile register 805. Each profile represents a set of commands, and multiple profiles are stored in profile bitmap 810. The commands that form a given profile are stored in command memory 820. Each bit in the profile corresponds to a command in the command memory. When set to 1, the corresponding command is included in the set and when set to 0 the corresponding command is not included. At the beginning of every pipeline cycle, PreCAM 415 selects the profile to work with according to the value residing in profile registers 805. The profile register is accessible to the preceding microsequencer, i.e., PreP 405, which selects the profile to be used from profile bitmap 810. The selected profile is processed by traversing its bitmap. For each non-zero value in the bitmap, the corresponding profile command is executed. Each of the memory values of profile bitmap 810 can define any set of entries from command memory 820, but this can dictate a sequence of execution that is not necessarily ordered. Commands determined by successive values in the profile are executed in the designated sequence. Control logic 815 serves as the profile command decoder. It translates the coded command fields into control signals to all units.

Shift logic 800 coordinates providing the proper data from various sources, e.g., PAIR 710, CAM 470 (accessed via CAM control), the PHB, and command memory 820, to various destinations namely PAIR 830 and lookup FIFO 835. Special logic 840 provides additional logic not provided by the CAM match function. For example, the CAM match function inherently provides equal, not-equal and logic-AND operators. The first two are the match/no-match results while the last is a match on several values concatenated together. This may be enough for basic routing requirements, but for ACL, CAR, and flow statistics a stronger set of operators is desirable. Functions like greater-than, less-than, range (i.e., less-than value1 and greater-than value2), and not-equal-to are particularly useful for qualifying specific fields of an entry. The desired functions can be implemented using the CAM but may cost many entries. Instead, the special logic saves these entries by providing a limited set of entries with an enhanced set of functions. In one embodiment, the special logic includes a number of logic units each having a primitive ALU, three operand registers and dual result flags. The ALU executes the function selected by the operator on two or three inputs and then gives the result in the flag bits, which are available, for example, as CAM lookup bits to the shift logic. Those having ordinary skill in the art will readily recognize that both a number of different logic functions can be implemented in this manner and each logic function can be implemented using a variety of digital logic techniques.

Lookup FIFO 835 is a memory that can store lookup keys generated by shift logic 800 for later use. In general, this memory moves through the pipeline so that its contents can be used by the CAM control module. It is provided as the input to a similar structure in the PreCAM stage of CAMP 430 discussed below. This scheme provides load balancing of, for example, generation of lookup entries between the two PreCAMs, allowing PreCAM 415 to do part of the work which is later completed by PreCAM 1100 of CAMP 430.

Based on the leaf pointer or pointers provided from the mtrie lookup performed by PLU 410 (or potentially an override value derived from the PreCAM 415 lookup stage) TLU 420 (FIG. 9) looks up table entries in a second data structure stored in TLU memory 465. In general, TLU 420 is designed to walk or navigate a linked list of data structures and store some of the fetched data in the corresponding PHB. The provided leaf pointer is used to locate the first data structure to be fetched by TLU control 900. The pointer to the next data structure is embedded in the first fetched data structure itself. Thus, TLU control 900 reads the data structure and then interprets it according to the fetch control register (FCR) code associated with the pointer and stored in FCR file 910. TLU 420 continues to fetch down the linked list, using the pointers embedded in each fetched data structure as the pointer to the next data structure until the end of the list is reached. Various different functions can be indicated by FCR values including: fetch a certain number of bytes from a certain offset of the structure into the PHB; index into an array of pointer/FCRs based on the load-balance key and fetch another pointer/FCR; update byte/packet counters; extract another pointer/FCR value to follow from an arbitrary offset in the structure and repeat; and end of list, i.e., last fetch has occurred. The fetched entries can be in any format and for any purpose. Based on decisions made by earlier stages of pipelined switch 215, e.g., generating two leaf pointers, TLU 420 can optionally perform the lookup operation twice per packet.

Address generation 905 generates the address to the FCR memory. The initial address is loaded at the beginning of a pipeline cycle according to the data provided by previous stages. Thereafter, the address can be determined in a variety of different ways. For example, in an "incremental mode," each FCR in FCR file 910 is addressed sequentially. In an "external mode," the next FCR address is read from an external memory. In still another example, each FCR has a link to the next appropriate FCR entry. These options permit having a different linked list structure for different types of packets, since each leaf pointer from PLU 410 points to an FCR number based on its type. For example, an IP unicast packet selects an FCR that defines the IP unicast linked list format, multicast packets select a multicast linked list format, etc. FCR file 910 includes multiple FCR registers. TLU control 900 uses the information in the FCR to control both the search in TLU memory 465 and the accumulation of certain statistics via statistics update logic 915. Note that statistics update logic 915 is part of TLU control 900. In one embodiment of the present invention, there are 128 FCRs in TLU 420.

After TLU 420 reaches the end of the linked list, it completes storing the fetched information into appropriate locations, e.g., the corresponding PHB and PAIR 920, and signals to pipeline control that it has completed its operation.

The next stage in pipelined switch 215 is the midprocessor microsequencer (MiP) 425. As noted above one embodiment of the present invention provides PreP 405, MiP 425, and PoP 435 as three separate instantiations of the same microsequencer logic. The microsequencer logic serves as a programmable general purpose machine for header portion processing. The basic architecture of MiP 425 is described above in the context of PreP 405. Thus, execution unit 1000, instruction fetch 1005, and operand fetch 1010 are largely identical to their counterparts in PreP 405. One significant difference between PreP 405 and MiP 425 is that MiP 425 interfaces with TLU memory 465 instead of PLU memory 460.

In one embodiment, MiP 425 is primarily responsible for selecting the appropriate profile to be used by PreCAM stage 1100 of the following CAMP 430 stage. Profile selection determines which features will executed on packet, e.g., ACLs, CAR, and flow statistics. MiP 425 can determine the free queue to be used when the packet arrives at RBM 220. Information about the free queue can be stored in the BHDR so that as RBM 220 accepts each packet, it can examine the BHDR to pick a buffer from the specified free queue. In another example, MiP 425 is programmed to check the packet size against the maximum transmission unit (MTU) size, i.e., the size of the largest packet that can be processed by a particular output interface. Appropriate data is stored in a corresponding PHB and/or PAIR 1035, and operation of the pipeline proceeds to the next stage.

Figure 11:
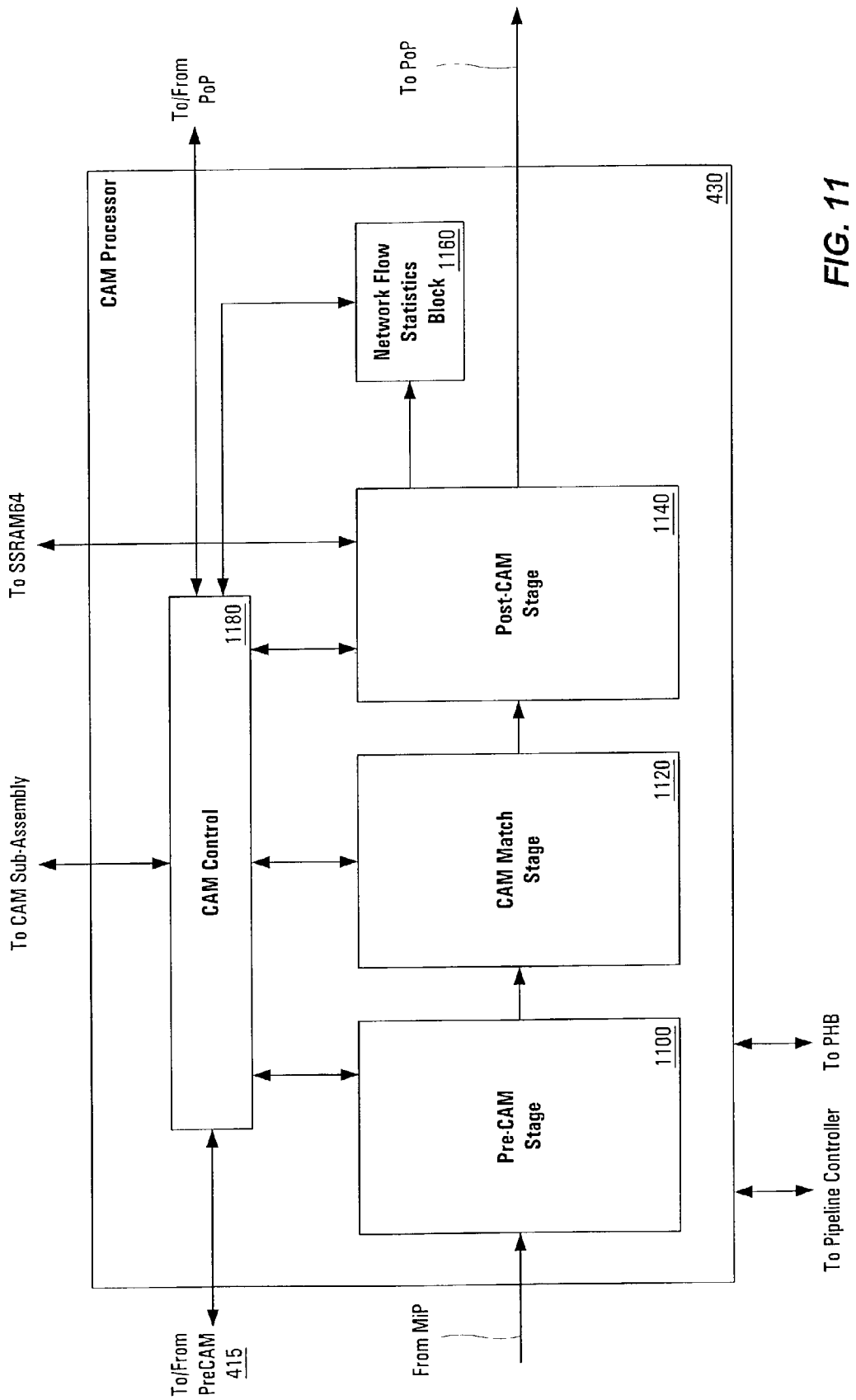
FIG. 11 is a high-level schematic of content addressable memory processor (CAMP) pipeline stage 430 according to one embodiment of the present invention.

FIG. 11 illustrates an overview of content addressable memory processor (CAMP) 430. The three main stages of CAMP 430 include PreCAM stage 1100, CAM match stage 1120, and PostCAM stage 1140. Together, these CAMP stages perform most of the CAM operations used by pipelined switch 215.

PreCAM stage 1100, which is identical in most ways to PreCAM 415, prepares various lookup words from pre-defined profiles. The lookup words are constructed from data found in various PHBs and PAIR registers from previous stages, the output of special logic registers, e.g., for range and comparison operations, or even the results of other CAM lookups such as for compression of wider fields. PreCAM 1100 is similar in function to the PreCAM 415. CAM match stage 1120 takes the prepared lookup words from PreCAM 1100 and submits them to CAM 470, collecting the results into a match FIFO. PostCAM stage 1140 processes the contents of the match FIFO. Such processing can include: for ACL entries, flagging the packet to be permitted or dropped (when multiple ACL rules are matched), immediately forwarding the packet, or flagging the packet for logging by CPU 265; incrementing counters, e.g., bytes/packets, per entry; for CAR entries, updating token buckets, timestamps and conform and exceed byte/packet counters; fetch additional data from SRAM64 475 into a PHB for the current packet for subsequent processing by the PoP 435; or even performing subsequent CAM lookups as necessary. Access to CAM 470 is controlled by CAM control block 1180. Additionally, network flow statistics block 1160 processes entries from the CAM for network flow statistics.

In one embodiment, CAM control block 1180 provides the ability to access CAM 470 using a round-robin arbiter among the stages or "agents" using the CAM and having the highest priority, e.g. PreCAM 415, PreCAM 1100, and PostCAM 1140. CAM match 1120 is granted access if there is no other request from the high priority agents, and network flow statistics block 1160, which has the lowest priority, is granted access for its requests only if there is no other request from the other agents. In another embodiment of the present invention, there are sufficient clock cycles available to CAM match 1120 for 15 CAM accesses per packet thereby allowing a high number of features without performance impact. In general, there is no restriction on how the CAM accesses are distributed among the various stages and netflow block 1160.

Figure 11A:
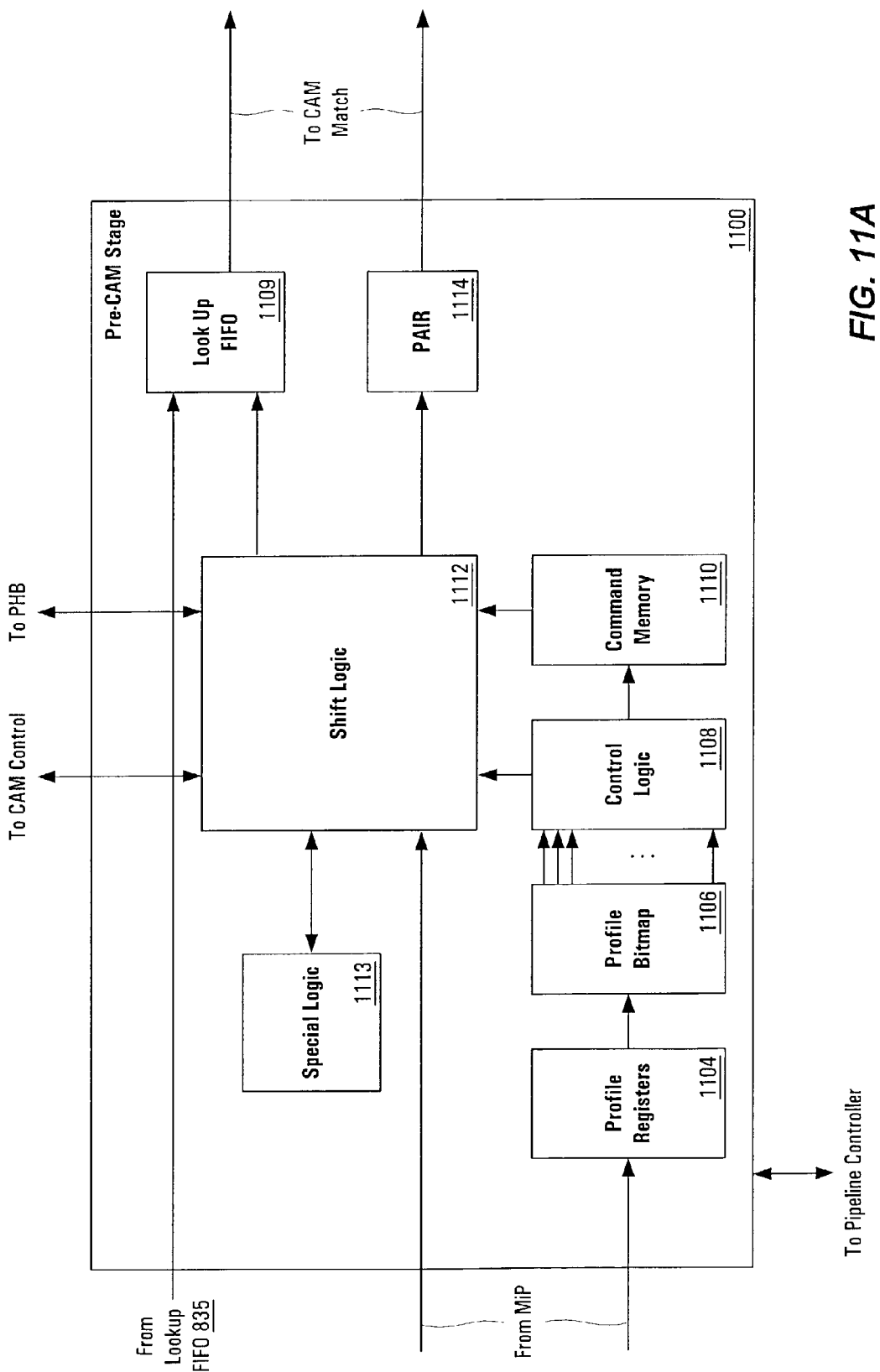
FIG. 11A is a high-level schematic of pre-content addressable memory (Pre-CAM) pipeline stage 1100 of CAMP block 430 according to one embodiment of the present invention.

FIG. 11A illustrates PreCAM 1100 which is largely identical in structure to previously described PreCAM 415 illustrated in FIG. 8. Thus, PreCAM 1100 is a state machine that is pre-configured with a series of different profiles. Each profile describes a set of data fields taken from various places in the PHB or other data registers associated with the packet. Each profile entry represents the fields needed to concatenate together and issue to CAM 470 for processing a certain feature, e.g., ExACL, CAR, policy based routing (PBR), different network flow statistics tables, etc. Profile registers 1104, profile bitmap 1106, control logic 1108, command memory 1110, shift logic 1112, special logic 1113, and PAIR 1114 have structures and functions corresponding to elements of PreCAM 415 having the same name as described above. In the case of PreCAM 1100, profile selection is made by MiP 425.

When a packet arrives at PreCAM 1100, the block builds the lookup words in the lookup FIFO 1109 according to the profile that was selected earlier by, for example, the MiP 425 and/or the contents of pre-lookup FIFO 835. PreCAM 1100 can use the results from PreCAM 415 to perform, for example, compression of fields within the packet. Lookup FIFO 1109 is used to forward the lookup words to CAM match stage 1120. Note that some fields in lookup FIFO 1109 may be overwritten by subsequent stages such as PostCAM 1140 or by PoP 435.

Figure 11B:
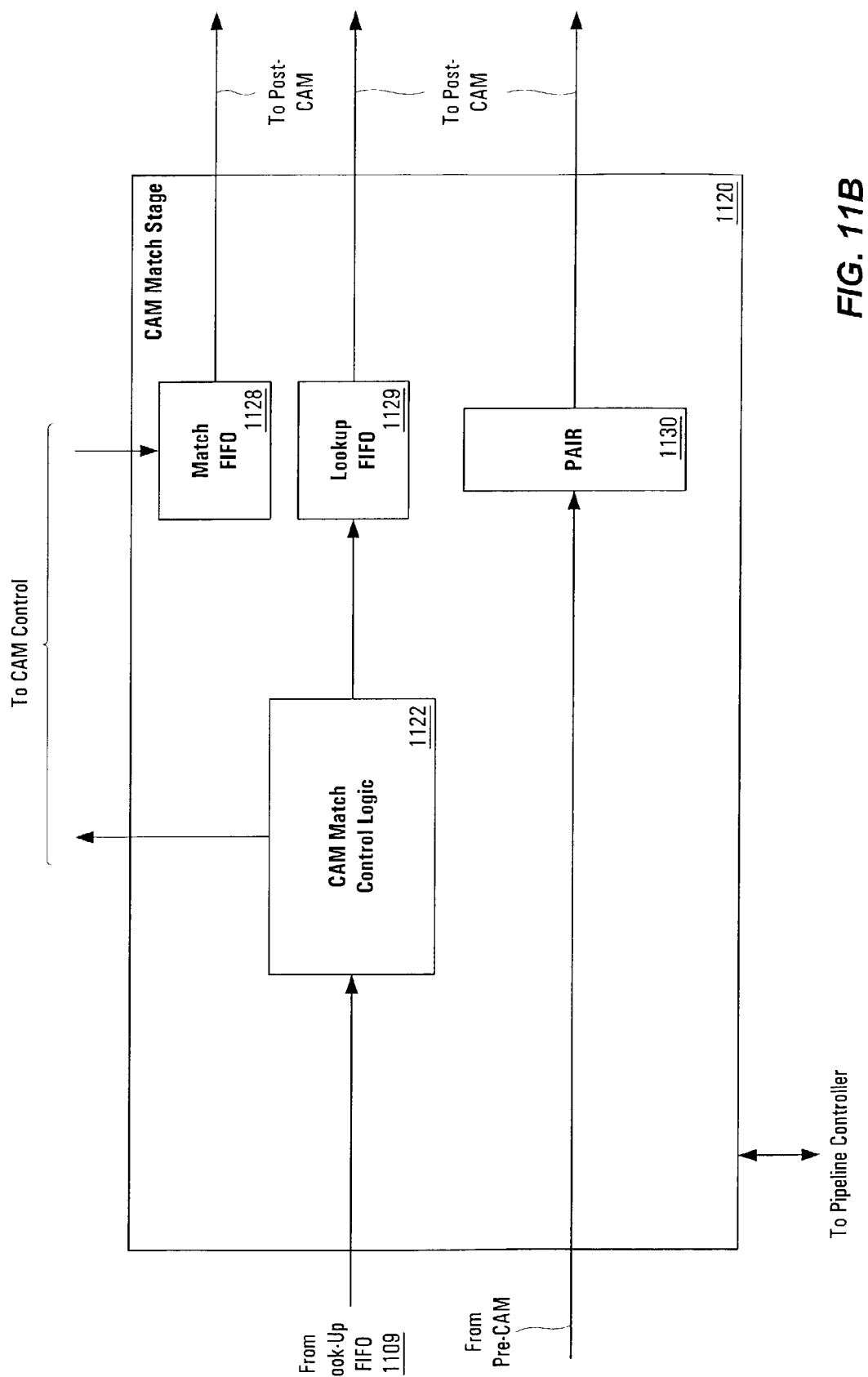
FIG. 11B is a high-level schematic of content addressable memory match (CAM Match) pipeline stage 1120 of CAMP block 430 according to one embodiment of the present invention.

FIG. 11B illustrates CAM match stage 1120. CAM match 1120 is the stage responsible for sending the lookup words to CAM 470 and writing back the matched values from CSRAM 474. As soon as CAM match 1120 takes over a packet, it receives the contents of the previous stage's lookup FIFO, i.e., lookup FIFO 1109, into CAM match control logic 1122. CAM match control logic 1122 now contains the lookup words that were prepared by PreCAM 415 to be sent to CAM 470 for match. Some or all of the lookup words are also stored in lookup FIFO 1129. CAM match control logic 1122 implements a state machine responsible for communicating with the CAM control and sending lookup words one after the other to CAM 470 while skipping the network flow statistics words. The lookup results are stored in match FIFO 1128 for transfer to PostCAM stage 1140. Some entries in CAM match control logic 1122, e.g., CAR entries, may be sent for lookup multiple times, with different continue bits. In those cases, the state machine determines the number of times each CAR entry needs to be sent for lookup by the value of the continue bits in the lookup word. In one embodiment of the present invention, the CAM match stage is instantiated twice in pipelined switch 215: once as a pipeline stage (1120) and once as part of the PostCAM block. PAIR module 1130 is typically included only in CAM match 1120.

CAM match control logic 1122 provides the main control of CAM match 1120. It interfaces with CAM control and sends controls to the rest of the modules CAM match 1120 based on its interfaces, the status of its lookup FIFO, and indications which come from each lookup word itself. Once CAM match control logic 1122 receives a start signal from pipeline controller 450 and an indication from its lookup FIFO that there is some entry to be sent for lookup, CAM match control logic 1122 sends out a request to the CAM control. The request remains asserted until CAM control acknowledges that it has received the results. If there are no more valid lookups to send, CAM match control logic 1122 de-asserts the request. Otherwise, the request signal remains asserted until the next receive acknowledgement. When there are no more lookup words to be sent, CAM match control logic 1122 waits for all the lookups that have already been sent to be completed.

Some of the data needed for controlling the lookup operations performed by CAM match 1120 is extracted from the lookup data itself by CAM match control logic 1122. As mentioned above, each CAR lookup word may need to be transmitted more than once with different continue bits each time. CAM match control logic 1122 also determines how many times each CAR entry of its lookup FIFO is sent to CAM 470 for lookup and with what continue bits. If the type of the entry received by CAM match control logic 1122 is not CAR, this entry just passes through the module as-is.

From CAM match 1120, data passes to PostCAM stage 1140 via match FIFO 1128 and PAIR 1130. FIG. 11C illustrates PostCAM 1140. PostCAM 1140 is the execution stage of CAMP 430. PostCAM 1140 updates ACL statistics and notifies the rest of the pipeline regarding permit or deny situations. PostCAM 1140 calculates CAR buckets, operates according to the conform/exceed action, and updates other statistics. For network flow statistics, PostCAM 1140 copies flow statistics entries to network flow statistics block 1160 and includes appropriate flags.

When the PostCAM 1140 takes over a packet, it gets control over match FIFO 1128. In other embodiments, a separate match FIFO would exist as part of PostCAM 1140, receiving the contents of match FIFO 1128 from CAM match 1120. The entries of match FIFO 1128 are read sequentially by control logic 1150 which decides whether to write the entry as a read request to the SSRAM64 475, and/or to forward the entry to PoP 435. CAR actions are sent to the CAR logic 1152, which performs the requested CAR operation and eventually forwards the appropriate data to PoP 435. After match FIFO entries are read by control logic 1150, entries are read from lookup FIFO 1129. Any flow statistics entries in lookup FIFO 1129 are passed on to flow statistics block 1160 via lookup FIFO 1159 along with a flag signaling whether or not a drop occurred for this packet before this netflow entry, e.g., because of CAR or ACL. Lookup FIFO 1129 entries that are not flow statistics entries are ignored. Data read from SSRAM64 475 is split between CAR logic 1152 and the PHB.

CAR logic 1152 performs CAR calculations, updates and actions. In one example, CAR logic 1152 writes an updated bucket back to a FIFO (not shown), and the selected action is forwarded to PoP 435. If the CAR action contains some changes to the lookup words, CAR logic 1152 signals control logic 1150 to perform the change and retransmit the lookup words from the current CAR entry forward, to CAM 470. That CAM access is typically controlled by CAM match circuitry that is part of control logic 1150, and which is largely identical to CAM match 1120 described above. Matched lookup words and CAR buckets that were read after this change (and before the new matched words are received from the CSRAM 474) are ignored. When the new data arrives from the CSRAM 474 to match FIFO 1128, the same processing steps are performed.

Figure 11D:
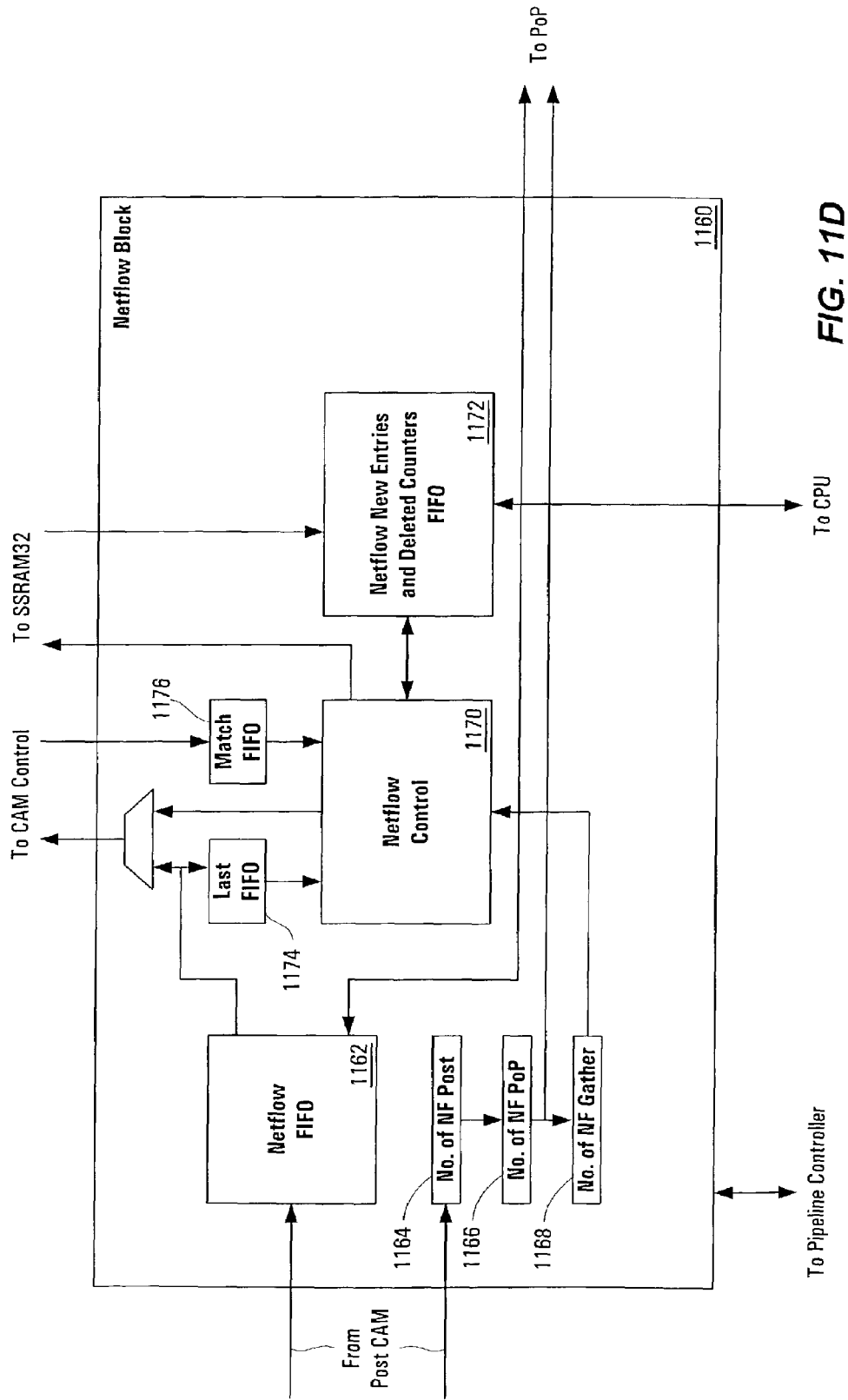
FIG. 11D is a high-level schematic of netflow block 1160 of CAMP block 430 according to one embodiment of the present invention.
Figure 12:
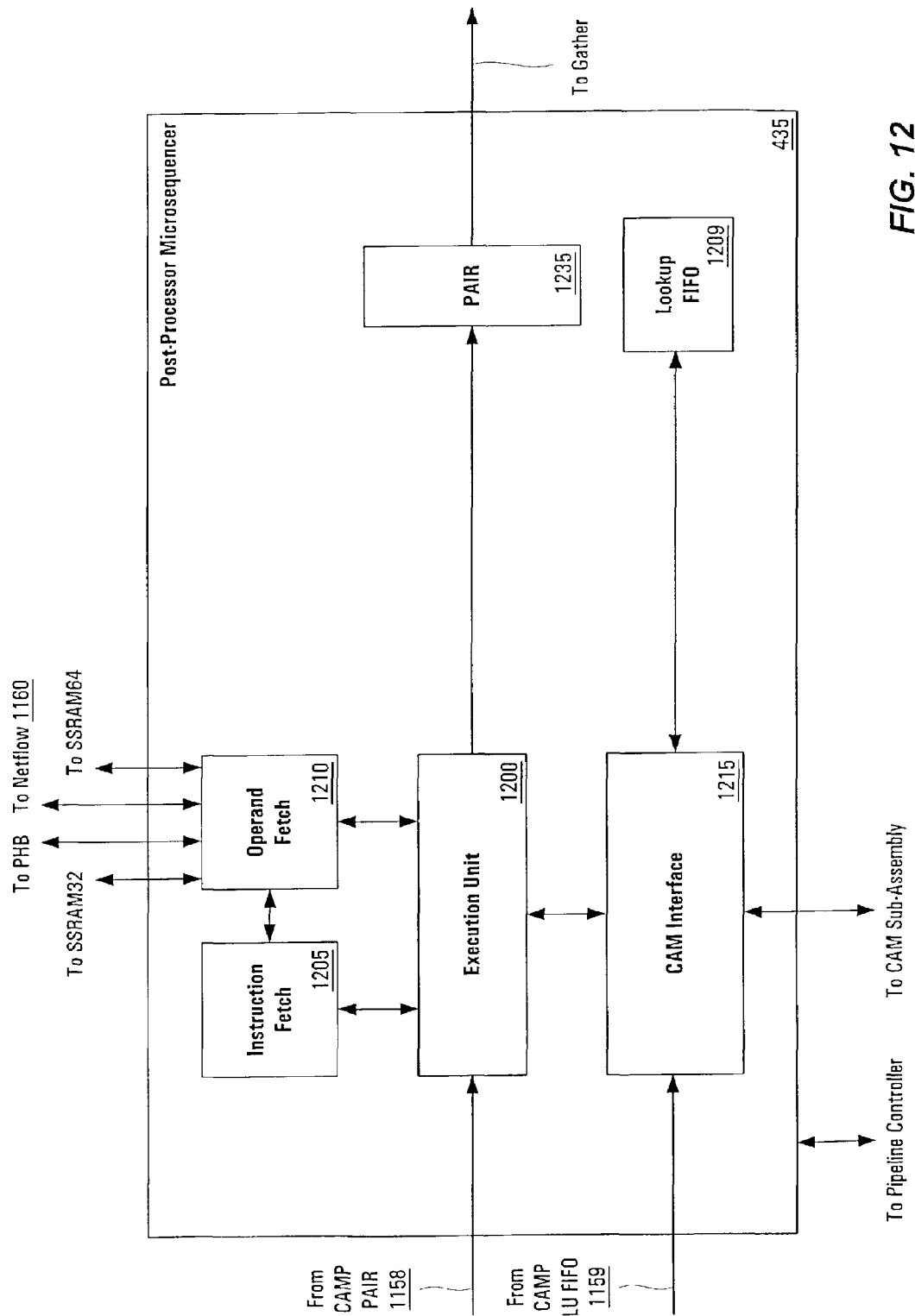
FIG. 12 is a high-level schematic of post-processor microsequencer (PoP) pipeline stage 435 according to one embodiment of the present invention.

FIG. 11D illustrates network flow statistics ("netflow") block 1160. Examples of techniques for maintaining network flow statistics can be found in U.S. patent application Ser. No. 10/079,229, filed Feb. 20, 2002, entitled "Method and Apparatus for Maintaining Netflow Statistics Using an Associative Memory to Identify and Maintain Netflows," naming David Belz, Eyal Oren, and Alon Ratinsky as inventors. This patent application is incorporated in its entirety herein by reference. Data from block 1140 is received by netflow FIFO 1162. In general, netflow block 1160 is used to maintain and update two types of counters: static and dynamic. Each counter corresponds to one or more entries in CAM 470. Static counters are regular counters whose entries in CAM 470 are added and deleted by CPU 265. Dynamic counters whose entries in CAM 470 are added and deleted automatically by logic in netflow block 1160. A configurable area exists in CAM 470 for the dynamic counters, and this area is treated as a FIFO by the netflow block 1160. This FIFO has an associated delete pointer and an add pointer. New entries are written to the add pointer address in CAM 470, while deleted entries are deleted from the delete pointer address. Additionally, a mode bit is used to select the netflow entry size, typically either 72 bits or 144 bits.

As each new entry is added to netflow FIFO 1162, an initial message is sent to CPU 265 which describes the entry being added to the TCAM. The CPU keeps a mirror of what entries are stored in the FIFO. If the space available in the netflow FIFO 1162 drops below a configurable threshold, the oldest entry in netflow FIFO 1162, as indicated by a delete pointer, is "flushed" by copying its current state, (e.g., byte/packet counters, time created and last-accessed timestamp) to a flush message sent to CPU 265. Since the CPU now has both the initial and final values of the counters and timestamps it can update the overall "aggregate" statistics matrix. Furthermore, a periodic background task continually flushes the oldest entries to the CPU in order to avoid data becoming stale and counter/timestamp overflows.

A FIFO (1172) for the initial and flush messages is placed between netflow control 1170 and the CPU to allow the CPU to process these messages asynchronously at a later time.

Netflow entries are initially prepared in a lookup FIFO earlier in the pipeline using a special code indicating whether the entry is a netflow-static entry or a netflow-dynamic entry. Once a packet is handed to the CAM match 1120, that stage sends only non-netflow entries, i.e., not netflow-static or netflow-dynamic, to lookup.

PostCAM 1140 copies netflow entries sequentially to netflow block 1160. Netflow block 1160 holds these entries until the packet is processed by Gather stage 440. Once Gather stage 440 starts working on this packet, netflow block 1160 begins sending the stored entries one after another to CAM 470 for lookup. When the last entry of this packet is sent to CAM 470, netflow block 1160 asserts an end signal to pipeline controller 450. Netflow block 1160 receives a match flag along with the matched CSRAM 474 entry at match FIFO 1176 for all lookups it transmitted. If there was no match, a no-match flag is received. Netflow control 1170 handles every read from the FIFOs as an atomic operation, meaning that it does not read a new entry before it has finished all operations for the previous entry. For each one of the entries in match FIFO 1176 one of the following actions can be performed: if there was a match, a statistics request is sent to SSRAM32 480 to update the bytes/packets and timestamp entries; if no match for a netflow-static entry, do nothing; if no match for a netflow-dynamic entry, add the entry to CAM 470, notify CPU 265, and send an initialize statistics request to SSRAM32 480.

In one embodiment of the present invention, PostCAM 1140 writes all the netflow lookup words of the packet to netflow FIFO 1162 along with a static/dynamic indication. Register 1164 counts the number of lookup words written by PostCAM. Typically one clock cycle after the start signal is asserted by pipeline control 450, the value in register 1164 is copied to register 1166 and register 1164 is reset. PoP 435 can then modify the lookup words written by PostCAM, for instance, due to a change in the packet's CoS as determined by PoP 435. On the next start signal assertion, the value in register 1166 is copied to register 1168. The lookup words are sent one after the other to CAM 470 with the changes that were written by the PoP 435. Those words are also copied to last FIFO 1174 for a later use in case of no-match condition. After the last lookup word is sent, an end signal is sent to pipeline controller 450. Note that if the value in register 1168 is zero, the end signal can be asserted immediately.

The next stage in pipelined switch 215 is the post-processor (PoP) microsequencer 435. As noted above, one embodiment of the present invention provides PreP 405, MiP 425, and PoP 435 as three separate instantiations of the same general purpose microsequencer logic. The microsequencer logic serves as a programmable general purpose machine for header portion processing. The basic architecture of PoP 435 is described above in the context of PreP 405. Thus, execution unit 1200, instruction fetch 1205, and operand fetch 1210, are largely identical to their counterparts in PreP 405.

PoP 435 receives data from block 1150 of PostCAM stage 1140, lookup FIFO 1159, and that stage's PAIR 1158. For example, PoP 435 receives a pointer to the corresponding PHB containing the header portion and the results of the TLU lookup, i.e., the adjacency data as well as additional data that the TLU may have written into the PHB as per the FCRs. PoP 435 is generally responsible for a number of tasks including: handling exceptions detected by previous stages such as PLU 410, TLU 420, and PreP 405; processing CAR rules which were not processed in CAMP 430; processing adjacency data and preparation of the BHDR; and programming Gather stage 440 for the transfer of the packet as it exits pipelined switch 215. Note that PoP 435 typically does not build the BHDR, rather it computes any fields not actually determined by TLU fetches. Gather 440 ultimately collects together the various fields from the PHB into a contiguous structure forming the BHDR.

In checking for exception conditions, PoP 435 looks for any exception indication that may have been set by previous stages. If an exception occurred (e.g., wrong checksum, TTL expired, IP with options, route not found in the mtrie, etc.), PoP 435 decides, based on the exception type, how to proceed with the packet. It can either queue the packet on the "RAW" (slow path) queue for further processing by CPU 265 or it can send the packet on to RBM 220 with an indication to drop the packet. Pipelined switch 215 does not drop packets in order to avoid losing synchronization between header portions and tails. If PoP 435 identifies a packet that should be dropped, it marks the packet's BHDR and sends the header portion to RBM 220, allowing the RBM to drop the packet after the header portion is re-joined with its tail. PoP 435 also selects the appropriate gather profile such that the packet can have the appropriate BHDR prepended, and other changes such as MPLS tags pushed and popped, and encapsulation modifications made by gather stage 440.

In cases where PostCAM stage 1140 does not complete its processing of a packet, e.g., certain CAR actions, PoP 435 completes the process. In order to carry out this task, PoP 435 includes CAM interface 1215 enabling it to read from and write to CAM 470, as well as perform CAM lookups. CAM access is triggered by writing to a request type field of a request register (not shown) within control logic of CAM interface 1215. The request register contains which entry of the lookup FIFO 1209 to access, the type of access (lookup, read or write) and a lookup length, typically 72, 144 or 288 bits. Lookup entries are stored in the lookup FIFO 1209 where the PoP 435 has the ability to change any part of any entry. After the lookup is performed, or the read data from CAM 470 is valid, CAM interface 1215 sets an acknowledge bit in the TCAM Status register indicating that the data is ready for PoP to read and that the PoP is allowed to set again the request register. If the lookup results in a hit, CAM interface 1215 sets a match bit in the CAM status register. The end of a write instruction (which involves no acknowledgement) is signaled by CAM interface 1215.

Figure 13:
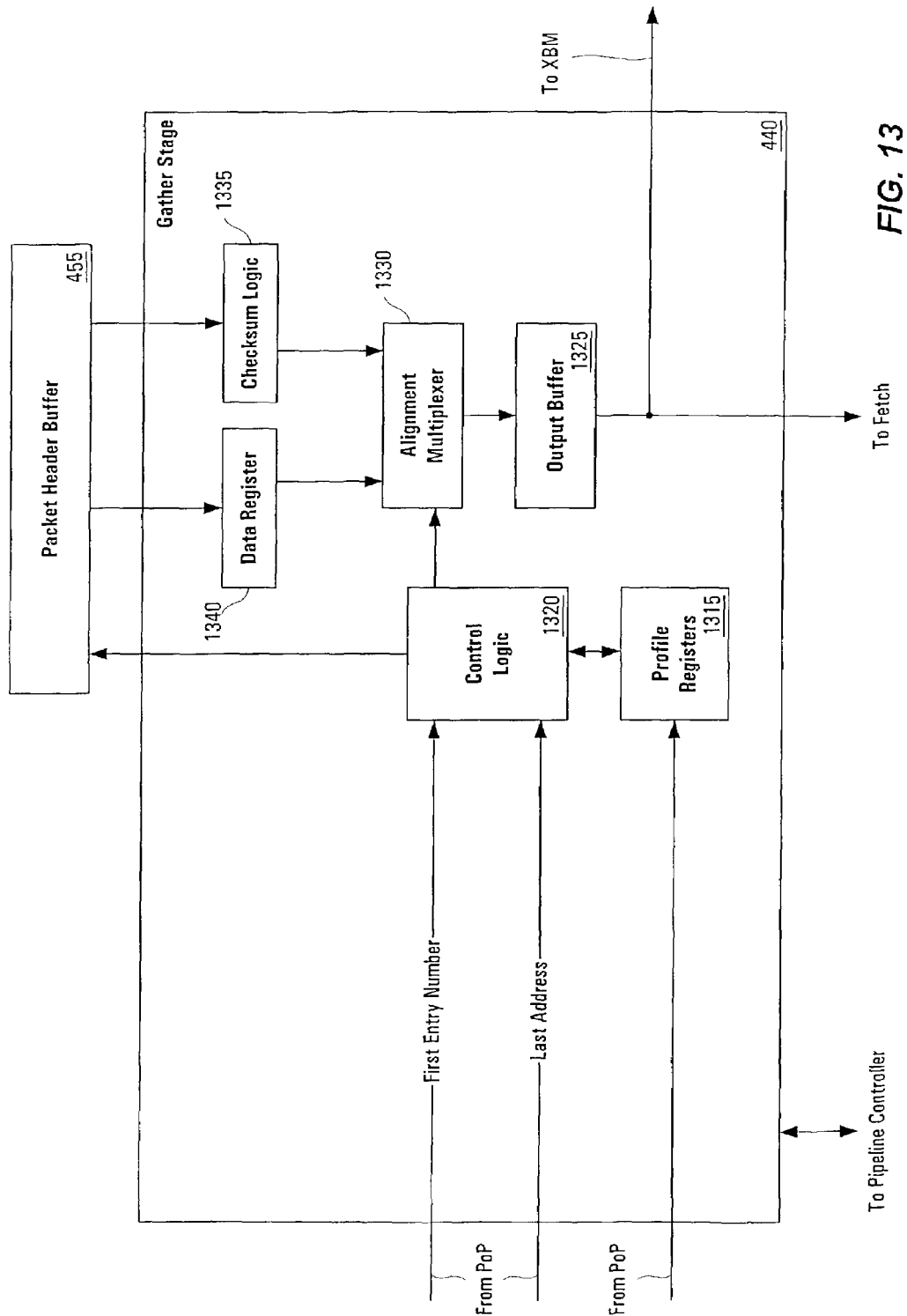
FIG. 13 is a high-level schematic of gather pipeline stage 440 according to one embodiment of the present invention.

FIG. 13 illustrates the next stage in pipelined switch 215, gather stage 440. The primary function of the gather stage is to collect together various pieces of the data contained in the PHB and other registers (e.g., PAIR) in preparation for departure from pipelined switch 215 and subsequent rejoining of header portions and tails in the RBM or TBM. More specifically, gather 440 performs processing that might be required by different protocols including: IP Checksum calculation; label switching, insertion or removal of labels; MAC layer rewrite/removal; BHDR data creation; and IP header modification/updating. Gather 440 transfers data to XBM 445 according to the programming in profile register file 1315. For each type of packet, a profile is defined. Each profile includes one or more entries in profile register file 1315. In one embodiment, profile register file 1315 has a sufficient number of entries that includes some number of entries (arranged in two sets) that can be written to directly by PoP 435. In order to allow one packet to be processed by gather stage 440 at the same time that PoP 435 is setting up the next packet, gather 440 alternates between the two sets of entries. Additionally, these gather profiles can be determined dynamically by an earlier pipeline stage depending on a variety of packet characteristics including, but not limited to, class of service, input or output destination, port number, or packet type.

In the receive direction, this task typically includes stripping the incoming encapsulation, e.g., by simply not reading it out of the PHB, and prepending a BHDR. If MPLS labels need to be popped or pushed, then gather 440 performs this task by using a profile which either does not copy the existing labels or inserts additional labels read from the adjacency. In the transmit direction, gather 440 creates what will be the payloads of the cells. XBM interface 445 resegments the data back into cells and adds appropriate cell header information. When a cell is being inserted to the front of the packet, the sequence number of this cell is created appropriately to flow correctly with the existing sequence numbers of the following cells.

Gather 440 operation starts when PoP 435 provides a first entry number to control logic 1320. The first entry value is the address of the first entry in profile registers 1315. This value is calculated by PoP 435 according to the type of the packet. Upon reception of a command from the pipeline control 450, Gather 440 loads an entry counter with the first entry value. It then reads from profile registers 1315 the entry's value and loads, for example, the start address, nibble count and last and IP packet start control bits into the respective registers (not shown). Control logic 1320 then initiates the copying of data from PHB 455 into the output buffer 1325. This is done by reading data from PHB 455 using the start address register. As data is read from different fields in PHB 455, it is concatenated and filtered by alignment multiplexer 1330 and control logic 1320 such that only fields that should be sent to the output linecard are read. Fields which are not part of the packet are skipped. Read data arrives in data register 1340. According to the nibble alignment of the data (i.e. which is the first nibble that must be transferred to XBM 445) alignment multiplexer 1330 is controlled. Output buffer 1325 is loaded according to the nibble counter. After the data is loaded into the output buffer, the nibble count is decremented. This process continues until the nibble count expires. When this occurs, the last bit in the profile entry register is checked. If set, the header's transfer is completed and an end signal to the pipeline control 450 is asserted. Otherwise, the next entry in profile registers 1315 is read.

If the entry counter overflows, a fatal error is reported and pipelined switch 215 halts. If the IP packet start bit in the entry is set, gather 440 assumes that the start address points to the first byte of an IP header. In that case, checksum logic 1335 is reset and an IP checksum calculation is started on the following data. Forty bytes later, i.e. the end of the IP header where the checksum is located, the header checksum is replaced in the packet with the newly computed value.

As noted above, an instance of pipelined switch 215 can be placed in the transmit path, i.e., pipelined switch 245. When in the transmit path, the pipelined switch can receive data in the form of cells (some number of cells forming a packet) from fabric interface 240. In order to support this operation, gather 440 is preferably able to append data at the beginning of an IP packet or to enlarge the amount of information that is delivered by the BHDR, without changing subsequent cells. Since there is usually no gap between the end of a BHDR and the beginning of its IP packet, a new cell should be created that will compensate for the added data. Preferably, up to 2 cell insertions at the beginning of a packet can be supported.

Using an appropriate profile entry in profile register 1315, gather 440 can build up an extra cell. Additionally, to avoid the need to update the sequence number of tailing cells in the case of cell insertion, it is preferred to create the sequence number of the new first cells such that all the following sequence numbers are unchanged. Once a first cell is available at Fetch 400, it should save the cell sequence number and store it in the PHB. At the pipeline outlet, XBM 445 can assign decremented values to the new first cells it sends according to the number of inserted cells in such a way that the last cell of the header gets the original sequence number of the terminating cell which was found in fetch 400. Cell sequence numbers increase from cell to cell which belong to the same packet. Thus, only the first cells need be updated, and the rest of the cells can keep their sequence number unchanged. Additionally, in case of extra cell insertions, both the original cell(s) and the extra cell(s) must have the same timestamp. In other words, all cells which Gather 440 sends in one stage time are marked with the same timestamp and treated as one header portion.

Gather 440 can also support recycling of header portions through the pipeline for additional rounds of pipeline processing. This feature is particularly useful in cases such as tunneling. In supporting of recycling, at least two issues arise: keeping packet arrival order in synchronization with packet transmission order (packet level ordering), and header-tail synchronization (header tail ordering). In one embodiment of the present invention, PoP 435 indicates to pipeline control 450 that its current packet needs to be recycled. Pipeline control 450 uses this indication to select the source of data to Fetch 400. Thus, at the beginning of the next stage cycle, Gather 440 writes a header portion into Fetch 400 via output buffer 1325. When used in the receive path, a profile entry used by Gather 440 for recycling is set by the PoP 435. When used in the transmit path, the header portion, e.g., the first two cells, should be sent from Gather 440 to Fetch 400 in the same format as when the head was sent from PreFetch 505 to Fetch 510.

Although some operation of gather stage 440 has been discussed in the context of cell manipulation, it should be noted (as discussed above) that a variety of different switch fabric transport schemes can be accommodated. Additionally, the switch fabric may itself be responsible for composing/decomposing packets into appropriate cells or other forms, thereby allowing gather stage 440 to manipulate packets directly.

Figure 14:
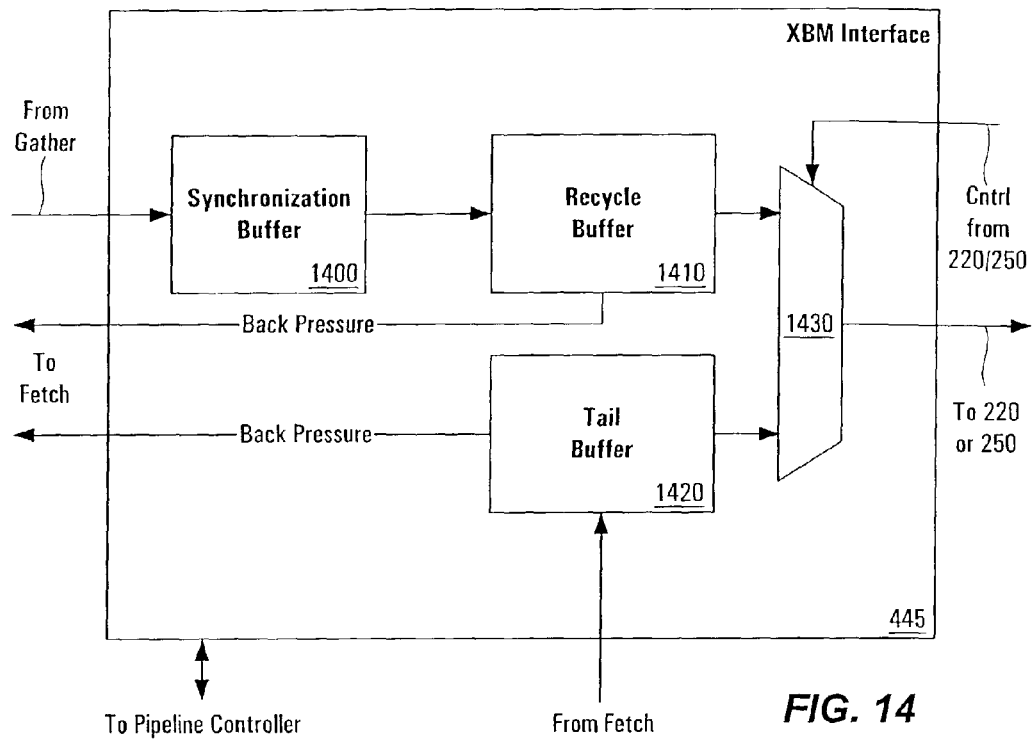
FIG. 14 is a high-level schematic of transmit/receive buffer manager (XBM) interface 445 according to one embodiment of the present invention.

FIG. 14 illustrates XBM interface 445. Since pipelined switch 215 is designed for use in both the receive and transmit paths, the final interface supports connection to either RBM 220 or TBM 250.

In one embodiment of the present invention, pipelined switch 215 operates in a different, e.g., faster, clock domain than other circuits such as RBM 220 or TBM 250. To support the change from one clock domain to the next, XBM interface 445 includes clock rate matching functionality. This may be accomplished by a synchronization buffer 1400, e.g., a dual port RAM (DPR) located at the end of the pipeline, or a two cell single port RAM (SPR) for synchronization buffer 1400. Writing to buffer 1400 is synchronized to one system clock while reading from it is synchronized to the other system clock. Synchronization buffer 1400 typically includes space for two header portions or cells of some appropriate type. When one is full, it can be read while the memory space is being filled. Thus, buffer 1400 is an example of an asynchronous FIFO. Note that this synchronization is needed only to data units which go through the pipeline, i.e., header portions, and not for tailing data units which bypass the pipeline processing. If there is no place in recycle buffer 1410 for an additional header portion immediately after the current header portion, then the backpressure signal is asserted by recycle buffer 1410 until there is a place for a new header portion. Tails need no clock synchronization since they are sent and received in the same clock domain. Tail buffer 1420 can be a simple DPR (functioning as a FIFO) and can similarly assert a back pressure signal to fetch 400.

For both the receive and the transmit paths, XBM interface 445 might get header portions from the pipeline (via Gather 440) where these header portions are out-of-order due to recycling. Thus, XBM interface 445 determines the correct order of the header portions and sends them accordingly to the RBM/TBM using a sequence indicating mechanism. Newer header portions are stored in the recycle buffer 1410 until the missing older header portion(s) is sent to RBM/TBM. For the transmit path, support for cell handling and ordering (as discussed above in the context of Gather 440) preferably exists in XBM interface 445.

Depending on control signals from RBM 220 or TBM 250, multiplexer 1430 transmits header portions or tails on to the next stage, i.e., RBM 220 or TBM 250 as appropriate. In general, there is no implied relationship between a transmitted header portion and an subsequently transmitted tail portion.

Figure 16:
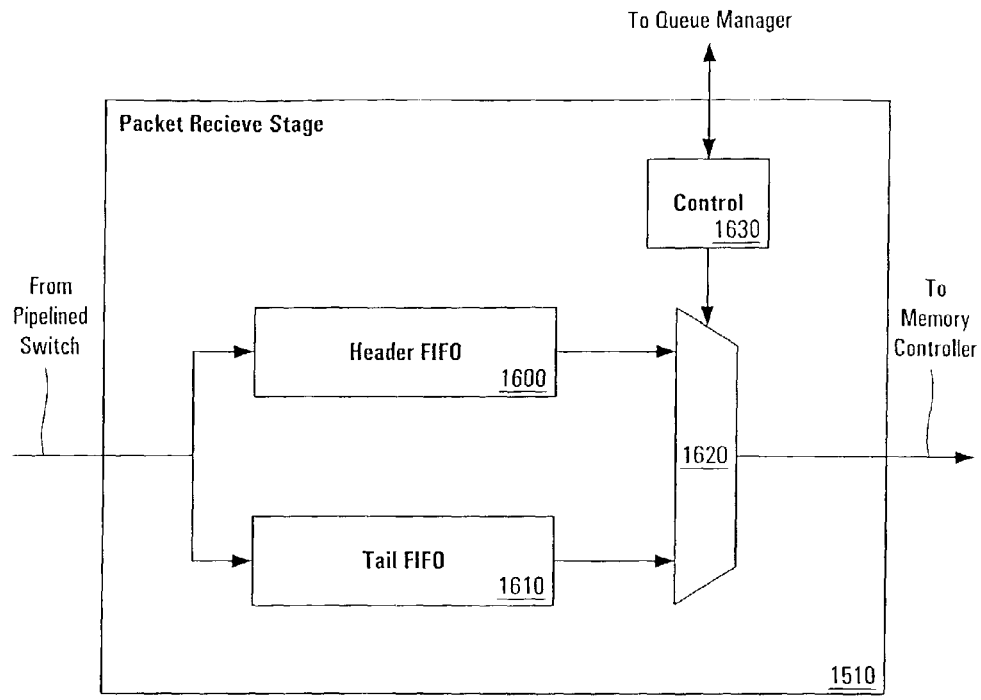
FIG. 16 is a high-level schematic of the packet receive stage 1510 of RBM 220 according to one embodiment of the present invention.

Receive buffer manager (RBM) 220 is shown in greater detail in FIG. 15. In one example, RBM 220 is responsible for receiving header portion and tail data from pipelined switch 215, reassembling them back into packets, storing the packets until the proper time, and sending each packet, cell by cell, to the switch fabric via fabric interface 230. The flow of header portions through pipelined switch 215 to RBM 220 is generally independent of the flow of tails from the first stage of pipelined switch 215 through to RBM 220. Both the header and tail portions are separately received in RBM 220 by packet receive stage 1510. As seen in FIG. 16, processed header portions go into header FIFO 1600, while tail portions are placed in tail FIFO 1610. The header and tail portions are combined by joining circuit 1620 under the control of control circuit 1630 and written into receive packet buffer 225 by memory controller 1520. Complete packets are typically written to receive packet buffer 225 only when both the header portion and its corresponding tail portion become available in packet receive stage 1510. While either the header or the tail portions can arrive first, writing will not occur until both are present in order to optimize the memory bandwidth of receive packet buffer 225. Thus, the first tail to be read out will always correspond to the first header portion to be read out, because header portions are not read until a complete tail is ready; neither header portions nor tails are ever dropped prior to reading out from packet receive stage 1510.

In one embodiment of the present invention, receive packet buffer 225 is constructed from SDRAM. Each buffer formed within receive packet buffer 225 holds a separate packet, and the size of the buffers within receive packet buffer 225 are configurable. Each packet is typically written to receive packet buffer 225 memory once and stays in its original location until it is finally read out for transmission to the switch fabric, freeing the location for a subsequent packet. At configuration time, software will divide receive packet buffer 225 into programmable fixed-length areas called 'buffers'. A buffer is the area where packets are written to. One and only one packet is ever associated with a buffer at any one time. Each buffer is associated with a buffer header (BHDR) data structure located at the very start of the buffer. Packet data is written to the buffer starting immediately after the BHDR. Not all buffers within receive packet buffer 225 need be the same length. For example, CPU 265 can divide to carve the buffer memory into a certain number of short buffers (e.g. 128 bytes), medium buffers (e.g. 600 bytes) and long buffers (e.g. 1500 bytes). This can provide more efficient utilization of the buffer memory since pipelined switch 215 can choose the appropriate buffer size to get the best (most efficient) fit for each packet. Unused buffers of each size are kept together on a free queue for buffers of just that size. After each buffer is finished with, it is returned to the original free queue it came from for reuse by another packet.

In order to organize the buffers into queues, RBM 220 includes a receive queue manager 1500. Queue manager 1500 provides control and coordination of packet receive stage 1510 and packet transmit stage 1560 as well as access to input rate shaper 1540. In one embodiment, queue manager 1500 supports 256K queue elements. Queue pointers are stored in queue pointer memory 1550, which is typically implemented as an SSRAM. A queue element is an integer (0 . . . 256K) that is the unit of data manipulated by queue manager 1500. Each queue element is associated one to one with each packet buffer, although different association schemes can be used, for example, by the queue manager in TBM 250. The association between queue elements and buffers is made at configuration time and is typically not changed except if the linecard is reset and reconfigured. Thus, in this example the number of packet buffers that can be carved out of receive packet buffer 225 is limited to 256K buffers. Every queue element can be on one and only one queue at a time. Unused buffers (queue elements) are kept on free queues, while buffers in use are kept on other queues. Each queue is logically a FIFO of queue elements. Elements are added to the tail of a queue (enqueued) and removed from the head of a queue (dequeued). Clients of queue manager 1500 issue enqueue and dequeue requests to the queue manager.

In the simplest form, a dequeue operation usually requires the queue number as an input parameter, and returns the queue element number and the associated buffer address in receive packet buffer 225. An enqueue operation requires both the queue number and queue element number as input parameters, and returns nothing. Examples of different types of queues that can be implemented include: simple queues (free queues, RAW queues, etc.); input shape queues (for use by input rate shaper 1540); unicast output queues; unicast high priority output queues; multicast output queues, and multicast high priority output queues. Those having ordinary skill in the art will readily recognize that a variety of different types of queues and queue uses can be implemented. In one embodiment of the present invention, RBM 220 supports 4136 queues including, 32 simple queues, 2048 input shape queues, 2048 unicast output queues, 16 unicast high priority output queues, 7 multicast queues, and one multicast high-priority queue. Moreover, the 2048 unicast output queues can be dynamically mapped in any arbitrary way to each of the 16 unicast fabric slots. The 2048 input shape queues can be dynamically allocated to any sub-interface.

Input rate shaper 1540 maintains the token buckets for all 2048 input shape queues. Input rate shaper (IRS) 1540 is responsible for shaping incoming packet traffic if so requested by pipelined switch 215. IRS 1540 interfaces with queue manager 1500 and is responsible for the shape queues maintained by RBM 220. Each of the shape queues have a leaky bucket that IRS 1540 is responsible for filling and emptying according to configuration and traffic. When IRS 1540 receives information from queue manager 1500 indicating that a shape queue is not empty, it combines the information with the leaky bucket status and decides from which of the queues the next packet should be sent.

In general, a leaky bucket has the following associated parameters:
  Rate—the average rate at which traffic should be sent out of the queue. Rate is translated into number of bytes, i.e., tokens, allowed to be sent every period of time. The amount of tokens are added every period of time.
  Burst—the maximum amount of data the queue can accumulate if it did not send traffic for some time. Burst is translated into maximum number of tokens that can be accumulated for the queue
  Bucket—the current number of bytes that the queue is eligible to send. Bucket is translated to number of tokens in the bucket. Note that this is a signed value. If the value is positive, then this queue is eligible to send.

The leaky bucket has a background process that goes through all the queues and adds the "rate" amount of tokens into the bucket. In one example, the fill process operates 8000 times per second so that a value of 1 for the rate parameter will represent an average bandwidth of 64 k bits/sec. A second process monitors the status of the buckets. Each time a bucket is positive means that at least one packet can be sent out of the queue. IRS 1540 will request a dequeue from this queue. The amount of bytes in this packet will be subtracted from the queue's bucket and the packet will be enqueued to the appropriate output queue as indicated originally by the pipelined switch in the BHDR. If the bucket goes negative as a result of token subtraction, the queue is no longer eligible to send data until it receives more tokens to make it positive again.

Packet transmit stage 1560 takes packets from the various RBM output queues and optionally segments them into specialized cells for transmission over the switch fabric. In one example, packet transmit stage 1560 can segment up to one packet to each of the 17 destination ports (slots) simultaneously (16 unicast plus one multicast). When more than one packet is being segmented, cells are generated in a round-robin fashion. The generated cells are passed to fabric interface 230 for sending to switch fabric 235. Queue manager 1500 provides packet transmit stage 1560 with signals indicating which destination slots have at least one outstanding packet to be transmitted in the queues allocated to that slot.

When packet transmit stage 1560 is able to begin segmenting another new packet for a particular slot, it asks queue manager 1500 to dequeue a packet for that slot. After dequeue, queue manager 1500 returns packet parameters to packet transmit stage 1560. Packet transmit stage 1560 then reads the first part of the packet from receive packet buffer 225 into the appropriate one of 17 internal segmentation buffers, and creates cells from there. If a packet is longer than the segmentation buffer, the read process is repeated. Once the last cell has been sent for a given packet, packet transmit stage 1560 requests queue manager 1500 to enqueue the packet onto a return queue as indicated in the BHDR. The return queue is typically a free queue, but can be overridden by pipelined switch 215 allowing it to direct the packet to a different queue, e.g., sending it to CPU 265.

Figure 17A:
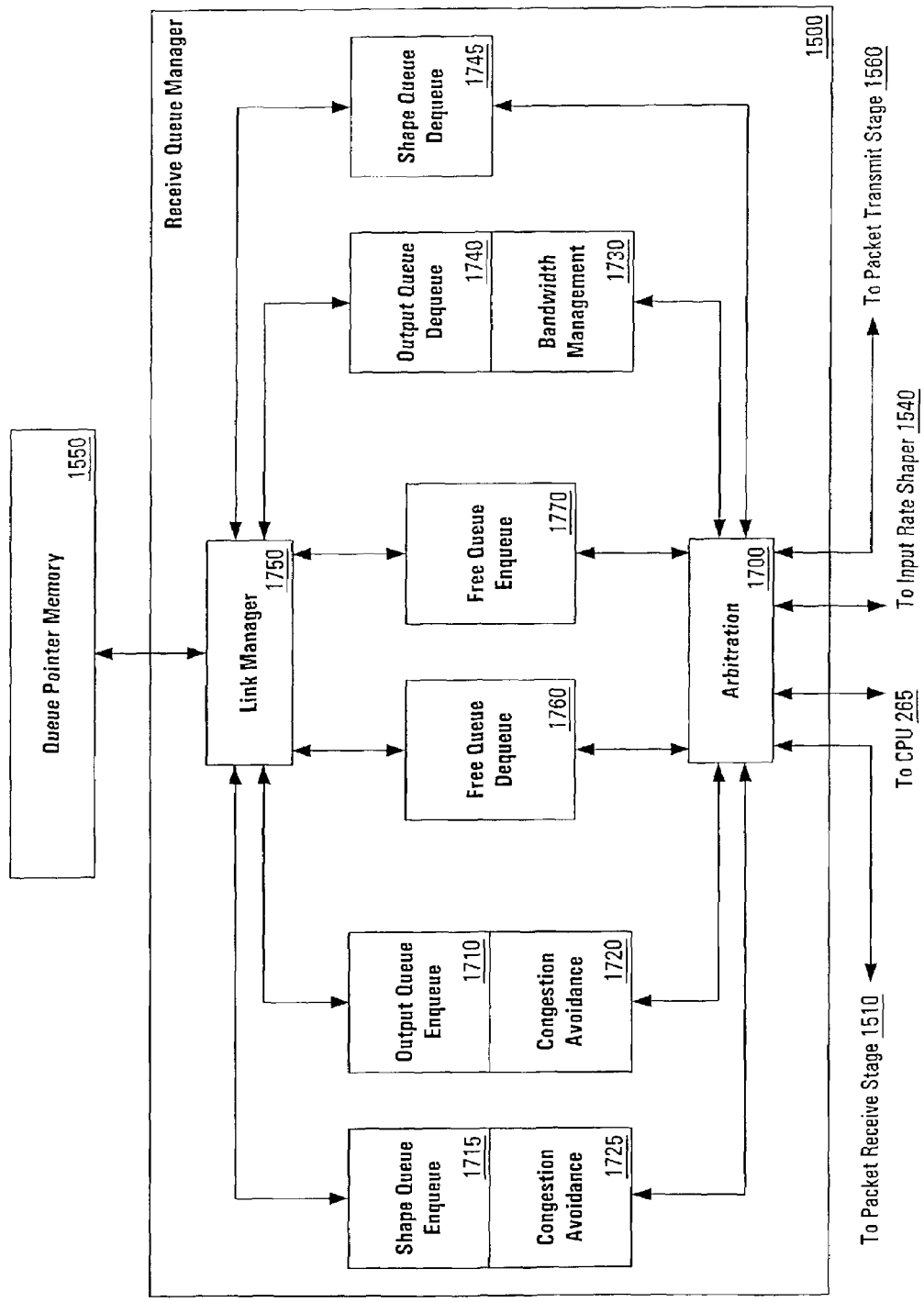
FIG. 17A is a high-level schematic of receive queue manager 1500 of RBM 220 according to one embodiment of the present invention.

Receive queue manager 1500 is shown in greater detail in FIG. 17A. Packet arrival is signaled to arbitration unit 1700 by packet receive stage 1510. Packets themselves do not enter queue manager 1500, but control and enable signals pass an indication of arrival along with any necessary parameters. Control information can also arrive at arbitration unit 1700 from CPU 265, packet transmit stage 1560, and/or input rate shaper 1540. One of ordinary skill in the art can readily see that many control and enable signal structures are possible.

Arbitration unit 1700 in turn controls packet enqueuing via output queue enqueue block (OQE) 1710 and shape queue enqueue block (SQE) 1715 and dequeuing via output queue dequeue block (OQD) 1740 and shape queue dequeue (SQD) 1745. OQE 1710 and SQE 1715 are each preceded by congestion avoidance modules 1720 and 1725 respectively which are, in some embodiments, circuits implementing the random early detection algorithm (RED; sometimes also referred to as "Random Early Drop" or "Random Early Discard") or the weighted RED algorithm (WRED) or one of their variants, all well-known in the art and generally referred to below as "RED algorithms". The original RED algorithm is described in S. Floyd and V. Jacobson, "Random Early Detection Gateways for Congestion Avoidance," EEE/ACM Transactions on Networking, Vol. 1, No. 4 (August 1993) (hereinafter Floyd & Jacobson), which is incorporated herein in its entirety by reference. Other RED algorithms are described in V. Jacobson, K. Nichols, and K. Poduri, "RED in a different light," Technical report, September 1999, which is incorporated herein in its entirety by reference. (See citeseer.nj.nec.com/jacobson99red.html) Congestion avoidance modules 1720 and 1725 can also implement more than one algorithm simultaneously, e.g., a programmable tail drop algorithm and a RED algorithm. OQD 1740 is preceded by bandwidth manager 1730 which is, in some embodiments, a circuit implementing the Modified Deficit Round Robin (MDRR) algorithm, also further discussed below.

Examples of RED algorithm implementations can be found in U.S. patent application Ser. No. 09/504,479, filed Feb. 14, 2000, entitled "High Speed Hardware Implementation of RED Congestion Control Algorithm," naming Garry Epps and Michael Laor as inventors. Examples of MDRR algorithm implementations can be found in U.S. patent application Ser. No. 09/503,976, filed Feb. 14, 2000, entitled "High Speed Hardware Implementation of MDRR Algorithm Over a Large Number of Queues," naming Garry Epps and Michael Laor as inventors. These patent applications are incorporated in their entireties herein by reference.

The aforementioned '552 application describes RED algorithms in detail. In one embodiment of the present invention, those algorithms include several enhanced features.

For example, the principle behind RED is that packets are deliberately dropped before congestion occurs in order to prevent it happening in the first place. For each packet that is to be put onto a queue, there is a probability computed for just dropping the packet instead. RED algorithms require that this drop probability should increase as the average queue size increases. Although a linear probability curve shape was once thought to be sufficient, more recent work has shown that a shape closer to an exponential can provide better performance. Thus, exponential probability curves can be used with positive effect in RED algorithms. Furthermore, the configuration of the maximum probability of the probability curve may not be necessary. RED will behave well with the simple assumption that the maximum probability is one.

In another example, a programmable probability curve is utilized, allowing, for example, a linear or exponential curve to be configured. The probability at the minimum threshold is zero, the probability at the maximum threshold is one, and there is any configurable curve between. As implemented, the approximation to this configurable curve often appears more like a multi-step staircase since the hardware involved is typically not capable of real multiply and divide operations, but rather uses simple shifts—limiting it to only operations involving powers of 2. One embodiment of the present invention uses a 512 entry SRAM which is free to be configured with any shape curve desired. This SRAM contains a normalized curve which is then scaled appropriately for each queue. It is reasonable to assume that the same shape curve will be used for all the queues, regardless of the configured minimum and maximum parameters set for each queue. However, the mechanism controlling the use of this SRAM does not preclude defining more than one curve and having different queues configured to use different curves. This feature might be applicable if it is determined that RED will perform better if a different drop probability curve shape is used for queues known to be carrying a certain type of traffic. The RED parameters for a queue describe the minimum drop threshold, the maximum drop threshold, an index into the curve SRAM, and an indication of how to scale the normalized curve to the specific curve needed for the queue. This last parameter is actually specifying exactly how many units, e.g., packets or bytes on the real curve are represented by one step on the normalized curve.

Queuing request information flows from arbitration unit 1700 to OQE 1710 and SQE 1715 via congestion avoidance 1720 and 1725, to free queue dequeue (FQD) 1760, to free queue enqueue (FQE) 1770, to OQD 1740 via bandwidth management 1730, and to SQD 1745 and then to link manager 1750. Link manager 1750 processes the primitive queuing operations of enqueue and dequeue. It manages the per queue state information (kept internally to 1730) as well as the per queue-element storage kept in the queue pointer memory 1550. In one embodiment of the present invention, the internal data structures maintained by link manager 1750 include:

HEAD: One entry for each queue. Each entry indicates the queue element number of the head of this queue (i.e. the element returned on the next dequeue)

TAIL: One entry for each queue. Each entry indicates the queue element number of the tail of this queue (i.e. the most recent element enqueued)

LENGTH: One entry for each queue. Each entry indicates the current instantaneous length (in packets) for this queue. This field is used by the congestion avoidance module(s) for determining the average queue depth and for tail dropping.

AVERAGE LENGTH: One entry per queue. Each entry contains the current time-averaged depth (in packets) for this queue. This value is exponentially decayed with a programmable time-constant. The average length is used by the congestion avoidance module in conjunction with the drop probability curve to compute a drop probability for each enqueued packet to this queue.

Other structures kept on a per-queue basis can include congestion control configuration. Examples of congestion control parameters are: (1) tail drop threshold, which indicates an absolute threshold for the instantaneous depth of the queue; (2) RED parameter set, indicating which sets of RED parameters are relevant to this queue while a value in the packet's BHDR determines the exact RED parameters to use; and (3) drop counters of packets and/or bytes dropped from this queue/COS.

Data structures maintained by link manager 1750 in queue pointer memory 1550 include:

LINK: One entry for each queue element. Written when enqueuing only. Read when dequeuing only. Each entry indicates the queue element number for the entry which follows this one in whatever queue it is on. The value is undefined if it is the last element of the list.

BADDR: One entry for each queue element. Written at initialization time only. Read when dequeuing only. Each entry indicates the physical memory address of the buffer associated with this queue element.

PKT_LENGTH: One entry for each queue element. Written when enqueuing only. Read when dequeuing only. Each entry indicates the length of the packet being stored in the buffer.

QE-INFO: One entry for each queue element. Written when enqueuing only. Read when dequeuing only. The information stored here differs between RBM 220 and TBM 250, but in each case it is information either taken from the BHDR at the time the packet first entered the circuit or other information computed at the time of enqueue, and its purpose is to accelerate the client modules of queue manager 1500 by providing them with information which saves them from having to wait for an SDRAM read of the BHDR.

In one implementation, link manager 1750 is a conventional memory access controller (or arbiter) managing competing resource demands on queue pointer memory 1550. Queue pointers are fetched from queue pointer memory 1550 by OQD 1740 or SQD 1745 via link manager 1750. These pointers are passed to packet transmit stage 1560 and are used there to fetch the actual packets from receive packet buffer 225. The queue pointers are themselves managed by free queue dequeue (FQD) 1760 (in the packet dequeuing process) and free queue enqueue (FQE) 1770 (in the packet enqueuing process). In general, all enqueue and dequeue operations performed by queue manager 1500 and originating from different sources (agents), i.e., packet receive stage 1510, CPU 265, input rate shaper 1540 or packet transmit stage 1560, are performed in parallel.

In one embodiment of the present invention, the output queues are managed as "virtual output queues," configured such that there is a one-to-one or one-to-many relationship between the RBM queue and the TBM queues. Utilization of the output queues is controlled in cooperation with OQE 1710 and SQE 1715 using congestion avoidance modules. If RED (or another congestion avoidance algorithm) is enabled on a queue, a packet destined for that queue may be dropped if the queue contains more than a certain amount of data already.

FQD 1760 picks a buffer in receive packet buffer 225 associated with the free queue determined previously by, for example, PoP 435 and indicated within the BHDR, and provides a pointer to the header (including the BHDR) and the tail portions into that buffer. FQD 1760 supplies the write address and pipelined switch 215 supplies the packet data to be written to packet receive stage 1510. Once the entire packet has been written to packet buffer 225, the packet receive stage 1510 signals receive queue manager 1500 to enqueue the packet to a queue described in the BHDR. However, the decision by OQE 1710 and/or SQE 1715 is controlled by the corresponding congestion avoidance circuit, as noted above.

In the case of the packet needing to be deliberately dropped (e.g., because of a checksum error, or an ACL), then memory controller 1520 is informed (by packet receive stage 1510) to write the packet to an unused area of receive packet buffer 225. In an alternative embodiment of the present invention, memory controller 1520 does not write out the packet at all and discards the data directly.

In order to dequeue packets enqueued in receive packet buffer 225, queue manager 1500 runs a bandwidth sharing scheme to service the various output queues for a given destination slot and to select packets for transmission to switch fabric 235. Each set of queues is serviced by OQD 1740 or SQD 1745, for example, using the modified deficit round robin (MDRR) algorithm. The MDRR algorithm is based on the well-known DRR algorithm but with one queue considered a high priority queue. The DRR algorithm is described in Shreedhar and Varghese, "Efficient Fair Queuing Using Deficit Round Robin," Proceedings of ACM SIGCOMM '95, Computer Communications Review, Vol. 25, No. 4, October 1995, which is incorporated herein in its entirety by reference. MDRR is one embodiment of the "DRR+" extension to DRR alluded to in this paper.

The high priority queue can be serviced in several modes:

Low Delay Mode: In this mode, the high-priority queue is serviced until it is empty. The remaining low-priority queues are serviced in the classic DRR fashion. This mode has the advantage of guaranteeing the lowest possible latency for the high-priority traffic, but at the expense of possible starvation of the lower priority traffic if there is overuse of the high-priority queue.

Fair Mode: In this mode, a quantum of data is taken from the high-priority queue, then one quantum from one of the other queues (chosen via the regular DRR algorithm), then back to a quantum of the high-priority again. This guarantees that all queues get serviced, at the expense of the latency on the high-priority queue.

Note that when in the Fair Mode, as the hardware round-robins between each of the ports for a given linecard slot it may be sending low priority traffic for all the other ports before coming back to a queue that has high priority for a port. In Low Delay mode, high priority traffic is very strictly sent first.

Upon dequeuing, packets are sent to fabric interface 230 and on to switch fabric 235 as switch fabric 235 and its associated scheduling/control systems dictate.

Although the RED congestion avoidance and MDRR dequeuing algorithms are described, those skilled in the art will realize that congestion avoidance and queue management schemes other than RED and dequeuing methods other than MDRR can be used. Those skilled in the art will also realize that queue management schemes may be omitted entirely. Accordingly, the present invention is not limited to any particular type of queue management scheme or dequeuing algorithm or to embodiments incorporating a queue management scheme.

It should also be noted that packet receive stage 1510 and packet transmit stage 1560 operate independently of one another. Input rate shaper 1540 also operates independently. In other words, packet storage in and retrieval from packet receive buffer 225 can occur simultaneously. Additionally, the architecture described in FIG. 17A is designed so that all six types of enqueue and dequeue operations can be performed in parallel.

Figure 18:
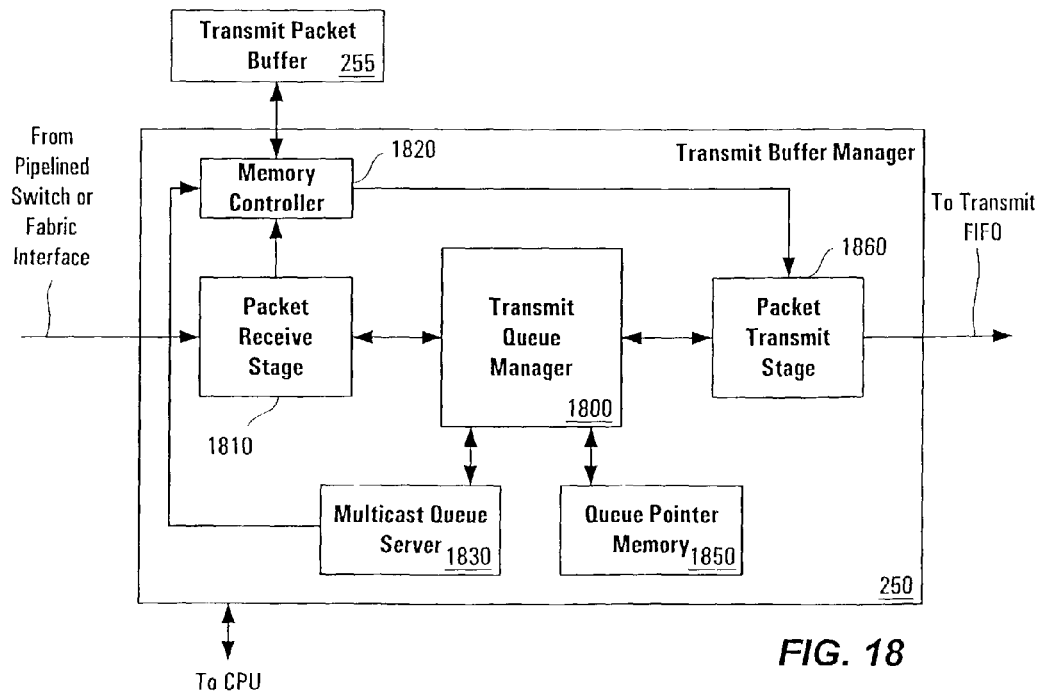
FIG. 18 is a high-level schematic of transmit buffer manager (TBM) 250 according to one embodiment of the present invention.

As shown in FIG. 2, transmit buffer manager (TBM) 250 receives packets in the form of switch fabric cells from pipelined switch 245 or alternately, when pipelined switch 245 is not used in the transmit path, from switch fabric interface 240 and reassembles the cells into their original packets. FIG. 18 illustrates one embodiment of TBM 250. As discussed above, pipelined switch 245 transparently performs features to the packets as they flow through from switch fabric 235 to TBM 250. Consequently, the order of cells within a packet is not disturbed, but it is possible for the inter-leaving of cells within two packets to change. This is handled by reassembly logic in TBM 250. In general, TBM 250 is very similar to RBM 220, sharing many of the same internal features. Some of the differences between TBM 250 and RBM 220 are:

Packet receive stage 1810 is designed for switch fabric cell reassembly into packets The numbers and types of implemented buffers (in transmit packet buffer 255) and queues can be different from those in RBM 220

TBM 250 includes a multicast queue server 1830 as described below

Packet transmit stage 1860 is tailored for packet transmission to transmit FIFO 260 and network physical interface 205 (for example by adding output encapsulation information for each packet).

Like receive queue manager 1500, transmit queue manager 1800 implements congestion avoidance and dequeuing algorithms as described above. Also, TBM 250 supports rate shaping as discussed above using bandwidth management 1730'.

The operation of bandwidth management 1730' is similar to that of the aforementioned input rate shaper. Each port has associated with it a leaky bucket. These leaky buckets control the maximum bandwidth that a given port can transmit. Average bandwidth parameters and a maximum burst rates are specified for each port. Any port which has met or exceeded these conditions is eliminated from consideration in the TBM round-robin. This allows a mechanism for rate-shaping the aggregate bandwidth being transmitted down a given interface. By setting the average rate to the interface rate, this feature can be essentially disabled.

TBM queues are flexibly assigned to the channels. That means there is a block of queues, typically from 1 to 2048 in number, which are available for any given channel. One of these queues can be optionally designated as the High Priority queue for this port. Each queue has two separate leaky bucket mechanisms associated with it. The first is for controlling the minimum bandwidth the queue gets (i.e. the guaranteed bandwidth). The second is for controlling the maximum bandwidth the queue gets (i.e. the rate shaper). Each of these leaky buckets are configured independently for the average rate (typically from 64 kbps to 4.0 Gbps, in multiples of 64 kbits/sec) and the maximum burst (typically up to 2.1 G bytes).

In one embodiment, each non-high-priority queue is configured with an additional parameter called the DRR quantum. When requesting a packet for a given channel, an algorithm for selecting the particular queue to use is as follows: (1) The high priority queue gets all the bandwidth it requires—up to a configured limit. This queue gets the guaranteed best latency path through the card to this port. Nothing can get ahead of it resulting in the best possible latency &jitter performance. (2) Each low-priority queue gets it's configured minimum guarantee. By configuration, these are all achievable. (3) The remaining link bandwidth is split among all the low-priority queues in proportion to the per-queue DRR quantums configured. In addition, there are per queue maximums which can kick in during this phase and will take the queue out of the DRR loop. This provides a mechanism to differentiate between queues when there is congestion between queues and all the minimum bandwidth guarantees have been met.

Figure 17B:
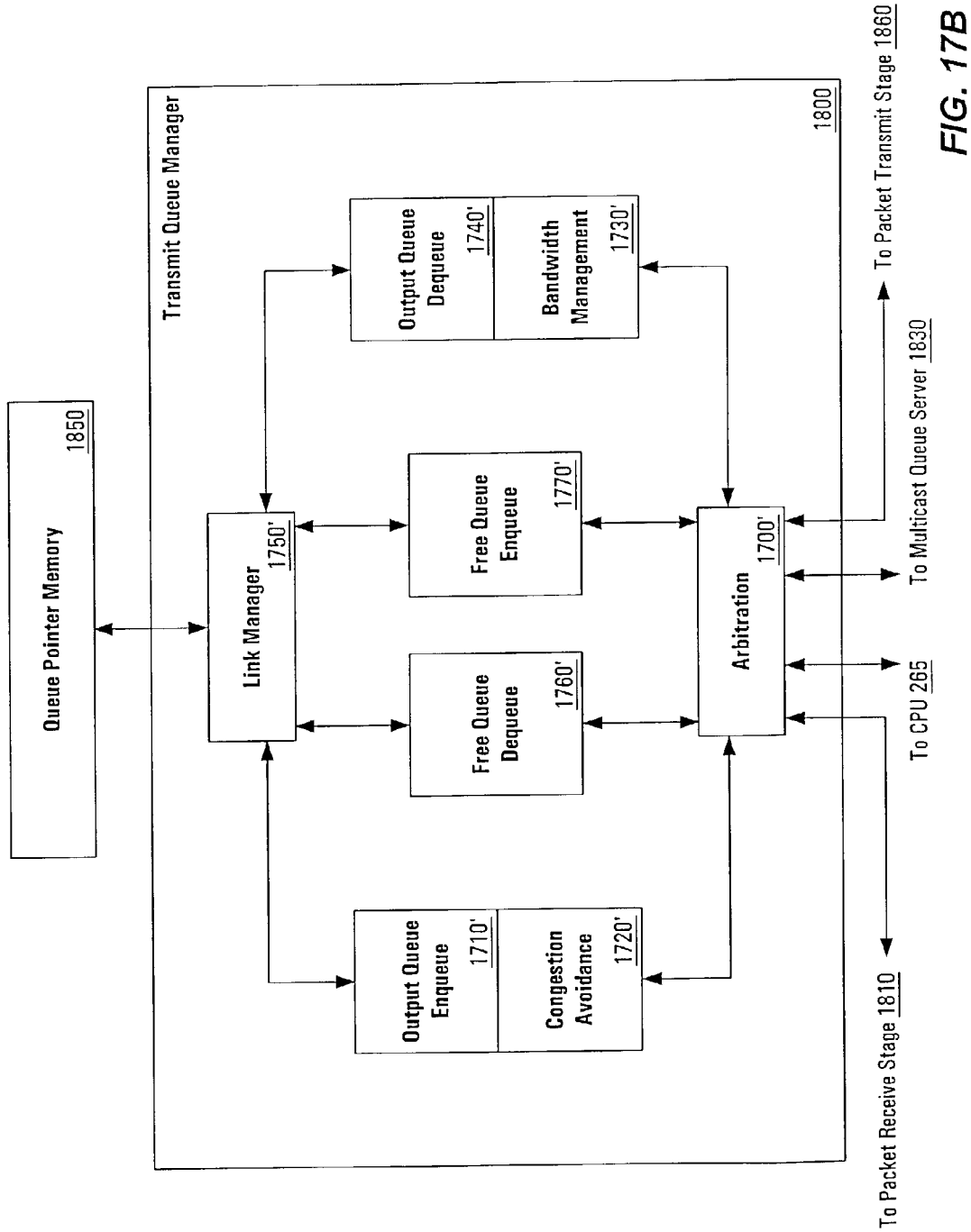
FIG. 17B is a high-level schematic of transmit queue manager 1800 of TBM 250 according to one embodiment of the present invention.

Transmit queue manager 1800 is shown in greater detail in FIG. 17B. In general, each of the "primed" objects (e.g., 1700') operates in a manner similar to its un-primed counterpart (e.g., 1700) from FIG. 17A. Note that queue manager 1800 has only four queue management blocks because input shape queues are not utilized in the transmit path. Additionally, transmit queue manager 1800 is a client of multicast queue server 1830 and not input rate shaper 1540.

Figure 19:
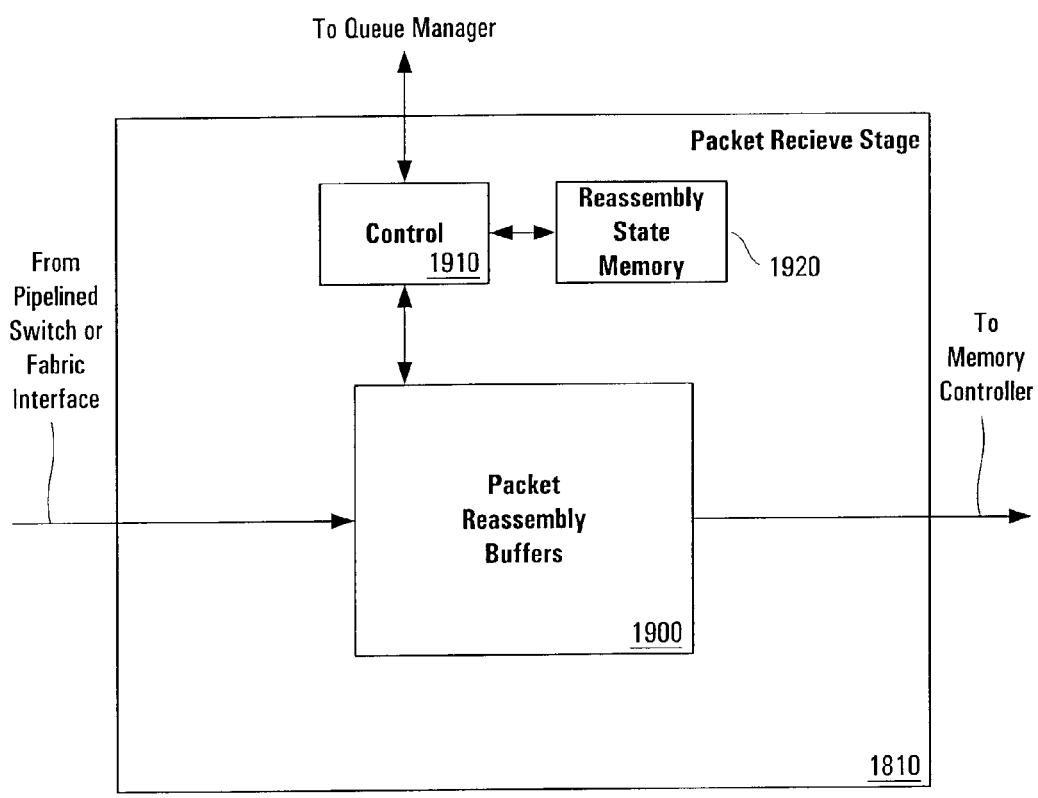
FIG. 19 is a high-level schematic of packet receive stage 1810 of RBM 220 according to one embodiment of the present invention.

Packet receive stage 1810 is shown in FIG. 19. Packet receive stage 1810 can typically reassemble multiple packets simultaneously. In one embodiment, it can reassemble up to 32 packets simultaneously (one unicast plus one multicast per slot in a 16 slot system) using 32 buffers. Every cell has a payload header which includes the free queue and output queue number determined by the receiving linecard. When the first cell of a packet is received, packet receive stage 1810 requests, via control 1910, queue manager 1800 to dequeue a buffer from the free queue specified. Queue manager 1800 returns the queue element number from this free queue and the corresponding buffer address (within transmit packet buffer 255) into which the packet is reassembled. Meanwhile, the packet receive stage 1810 uses an appropriate one of its packet reassembly buffers (typically organized as FIFOs) 1900 for temporary cell storage. The packet reassembly buffers 1900 are used to collect together several cells worth of data in order to make data transfer to transmit packet buffer 255 more efficient. Once some specified number of cells is in packet reassembly buffers 1900 or the last cell of a packet has been stored in buffers 1900, the data is written off to transmit packet buffer 255 and the process continues. Each reassembly in progress can be referred to as a "reassembly flow," and the reassembly flows are managed by control 1910 and reassembly state memory 1920.

Once the last cell of a packet is received, the packet is enqueued onto the queue number provided in the payload header. This queue number would normally be one of the output queues, but could also be a RAW queue or the multicast RAW queue (MRQ) described below. Note that since the packet receive stage 1810 typically has complete access to the packet's BHDR, it can extract and pass a number of additional parameters including: L3 length, output encapsulation information, and return queue fields to queue manager 1800. These parameters can be returned to other clients of queue manager 1800 when they dequeue the corresponding packet.

Multicast packets require additional work to those of unicast because they may need to be sent to the network physical interface multiple times. Furthermore, each replication potentially requires a different port number and MAC encapsulation. Packets requiring multicasting are enqueued to the MRQ. Multicast queue server (MQS) 1830 dequeues these packets and enqueues them to the appropriate output queues with the appropriate encapsulation indicated. MQS 1830 knows how to do this because each multicast packet includes a BHDR field with a multicast group ID field present. This field is written by the receive linecard when it determines the appropriate group for the packet.

Normally, a queue element can only be enqueued to one queue at a time. In order to allow MQS 1830 to enqueue the same packet to many queues simultaneously, a "fake" queue element is introduced. Fake queue elements are assigned from the same numbering space as regular queue elements (i.e. from the 256K). However, fake queue elements do not have a one to one relationship with a buffer in transmit packet buffer 255. They have no buffer associated with them at initialization time, and typically use a specialized free queue. The number of fake queue elements defined is software configurable, and would be based on the assumed percentage of multicast traffic expected. In one example, MQS 1830 can support up to 2048 simultaneous multicast packets in flight. For every packet MQS 1830 takes from the MRQ, it allocates a multicast reference counter. For every replication of a packet, the MQS dequeues a fake queue element from the specialized queue and enqueues it to the appropriate output queue. Once the last replication for a packet is enqueued to the output queues, the next packet is taken from the MRQ and another reference counter assigned. The MQS uses the multicast group ID on the BHDR to access a data structure usually stored in buffer 255, which indicates the list of output queues and encapsulation required for this packet. For each replication, a fake queue element is accepted from FQD 1760' and enqueued to the appropriate output queue.

Packet transmit stage 1860 has the task of requesting packets from queue manager 1800, prepending the encapsulation and sending the completed packet to transmit FIFO 260 for transmission into the network. Packet transmit stage 1860 first determines to which port the next packet is sent. This is accomplished using information from transmit FIFO 260, e.g., whether the FIFO is full, and from queue manager 1800, e.g., which ports have data queued and eligible for transmission. Packet transmit stage 1860 typically round-robins among the ports, determining which are ready to accept data and which have work to do. Alternate schemes include weighted round-robin schemes for use where ports have different sizes/capacities. Still other algorithms are available for optimizing selection of ports. This operation results in a port number which is passed to queue manager 1800 as the parameter for an output queue dequeue request. Queue manager 1800 uses a scheduling algorithm described above to determine from which queue among those associated with the indicated port to dequeue. Queue manager 1800 then returns a queue element number, a buffer address, and other information such as L3 length, start offset, output information, and a return queue.

In the preceding examples, the order in which the steps of the method or methods presently disclosed are performed is purely illustrative in nature. In fact, steps can be performed in any order or in parallel, unless otherwise indicated by the present disclosure.

The methods of the present invention may be performed in either hardware, software, or any combination thereof, as those terms are currently known in the art. In particular, the present method may be carried out by software, firmware, or microcode operating on a computer or computers of any type. Additionally, software embodying the present invention may comprise computer instructions in any form (e.g., source code, object code, interpreted code, etc.) stored in any computer-readable medium (e.g., ROM, RAM, magnetic media, punched tape or card, compact disc (CD) in any form, DVD, etc.). Furthermore, such software may also be in the form of a computer data signal embodied in a carrier wave, such as that found within the well-known Web pages transferred among computers connected to the Internet. Accordingly, the present invention is not limited to any particular platform, unless specifically stated otherwise in the present disclosure.

While particular embodiments of the present invention have been shown and described, it will be apparent to those skilled in the art that changes and modifications may be made without departing from this invention in its broader aspects and, therefore, the appended claims are to encompass within their scope all such changes and modifications as fall within the true spirit of this invention.

We claim:

1. An apparatus for switching packets, each packet having a header portion, an optional corresponding tail portion, and a class of service indicator, the apparatus comprising:
   a pipelined switch including:
      a plurality of packet header buffers (PHBs);
      a plurality of PHB pointers, each of the plurality of PHB pointers pointing to a PHB; and
      a plurality of pipeline stage circuits connected in a sequence and comprising at least a first stage circuit and a last stage circuit, wherein:
         each of the plurality of pipeline stage circuits begins an operation substantially simultaneously with each other of the plurality of pipeline stage circuits;
         each of the plurality of pipeline stage circuits passes data to a next stage circuit;
         at least one of the plurality of pipeline stage circuits is operable to access a content addressable memory;
         the first stage circuit reads the header portion and stores the header portion in at least one of the plurality of PHBs using at least one of the plurality of PHB pointers; and
         said last stage circuit outputs a modified header portion.

2. The apparatus of claim 1 further comprising:
   a content addressable memory coupled to the pipelined switch and accessible by at least one of the plurality of pipeline stage circuits.

3. The apparatus of claim 2 wherein the content addressable memory is a ternary content addressable memory.

4. The apparatus of claim 2 wherein the content addressable memory is operable to store at least one of packet classification information and network flow information.

5. The apparatus of claim 2 wherein the content addressable memory is operable to store at least one of access control list data, extended access control list data, and committed access rate data.

6. The apparatus of claim 1 further comprising:
   a receive buffer manager (RBM) including:
      a joining circuit coupled to the pipelined switch wherein the modified header portion and a corresponding tail portion are joined to form a modified packet;
      a receive queue manager coupled to the joining circuit and operable to buffer the modified packet in a receive packet buffer and enqueue the modified packet using the class of service indicator and a plurality of receive queues; and
      a dequeue circuit coupled to the receive queue manager and the receive packet buffer, wherein the dequeue circuit uses the class of service indicator to dequeue the modified packet to a switch fabric.

7. The apparatus of claim 6, wherein the receive queue manager comprises a congestion avoidance circuit utilizing a status of each receive queue.

8. The apparatus of claim 6, wherein the receive queue manager comprises at least one of a rate shaping circuit and a bandwidth management circuit.

9. The apparatus of claim 1 further comprising:
   a second pipelined switch receiving one or more packets from a switch fabric, the second pipelined switch including:
      a plurality of second packet header buffers (PHBs);
      a plurality of second PHB pointers, each of the plurality of second PHB pointers pointing to a second PHB; and
      a plurality of second pipeline stage circuits connected in a sequence and comprising at least a second first stage circuit and a second last stage circuit, wherein:
         each of the plurality of second pipeline stage circuits begins an operation substantially simultaneously with each other of the plurality of second pipeline stage circuits;
         each of the plurality of second pipeline stage circuits passes data to a next stage circuit; and
         at least one of the plurality of second pipeline stage circuits is operable to access a second content addressable memory.

10. The apparatus of claim 1 wherein the plurality of pipeline stage circuits further comprises:
   a pre-process circuit connected to the first stage circuit, wherein the pre-process circuit uses a second one of the plurality of PHB pointers to record first data in a corresponding PHB;
   a pointer lookup circuit connected to the pre-process circuit that compares the header portion to a first data structure and determines a leaf pointer using the second one of the plurality of PHB pointers;
   a table lookup circuit connected to the pointer lookup circuit that uses the leaf pointer to access one or more sets of linked data structures and to fetch second data, wherein the table lookup circuit uses a third one of the one of the plurality of PHB pointers to record the second data in the corresponding PHB; and
   a post-process circuit using the third one of the plurality of PHB pointers and coupled to the table lookup circuit, wherein the post-process circuit uses a fourth one of the plurality of PHB pointers to record third data in the corresponding PHB.

11. The apparatus of claim 10 wherein said plurality of pipeline stage circuits further comprises:
a pre-content addressable memory circuit coupled between the pointer lookup circuit and the table lookup circuit, wherein the pre-content addressable memory circuit accesses the content addressable memory based on a profile selected by the pre-process circuit, and wherein results of the access are stored in the header portion.

12. The apparatus of claim 1 further comprising a transmit buffer manager (TBM), the TBM including:
a third buffer that receives one or more packets from a switch fabric;
a transmit queue manager connected to the third buffer that buffers each of the one or more packets in a transmit packet buffer and enqueues the one or more packets using the class of service indicator and a plurality of transmit queues; and
a dequeue circuit connected to the transmit queue manager and the transmit packet buffer, wherein the dequeue circuit uses the class of service indicator to dequeue each of the one or more packets.

13. The apparatus of claim 12, wherein the transmit queue manager comprises a congestion avoidance circuit utilizing a status of each transmit queue.

14. The apparatus of claim 12, wherein the transmit queue manager comprises at least one of a rate shaping circuit and a bandwidth management circuit.

15. The apparatus of claim 1 further comprising:
a first content addressable memory coupled to the pipelined switch and accessible by at least one of the plurality of pipeline stage circuits;
a receive buffer manager (RBM) including:
a joining circuit coupled to the pipelined switch wherein the modified header portion and a corresponding tail portion are joined to form a modified packet;
a receive queue manager coupled to the joining circuit and operable to buffer the modified packet in a receive packet buffer and enqueue the modified packet using the class of service indicator and a plurality of receive queues; and
a dequeue circuit coupled to the receive queue manager and the receive packet buffer, wherein the dequeue circuit uses the class of service indicator to dequeue the modified packet to a switch fabric;
a second pipelined switch receiving one or more packets from the switch fabric, the second pipelined switch including:
a plurality of second packet header buffers (PHBs);
a plurality of second PHB pointers, each of the plurality of second PHB pointers pointing to a second PHB; and
a plurality of second pipeline stage circuits connected in a sequence and comprising at least a second first stage circuit and a second last stage circuit, wherein:
each of the plurality of second pipeline stage circuits begins an operation substantially simultaneously with each other of the plurality of second pipeline stage circuits;
each of the plurality of second pipeline stage circuits passes data to a next stage circuit; and
at least one of the plurality of second pipeline stage circuits is operable to access a second content addressable memory;
a second content addressable memory coupled to the pipelined switch and accessible by at least one of the plurality of pipeline stage circuits; and
a transmit buffer manager (TBM), the TBM including:
a third buffer that receives one or more packets from the second pipelined switch;
a transmit queue manager connected to the third buffer that buffers each of the one or more packets in a transmit packet buffer and enqueues the one or more packets using the class of service indicator and a plurality of transmit queues; and
a dequeue circuit connected to the transmit queue manager and the transmit packet buffer, wherein the dequeue circuit uses the class of service indicator to dequeue each of the one or more packets.

16. The apparatus of claim 1 further comprising:
a packet recycle path coupled between the first stage circuit and the last stage circuit, the last stage circuit being operable to send a recycle packet header along the packet recycle path.

17. The apparatus of claim 1 wherein the at least one of the plurality of pipeline stage circuits operable to access a content addressable memory further comprises:
a content addressable memory processor circuit operable to extract at least one field from the packet header, send the at least one field to the content addressable memory, and interpret results appropriately.

18. The apparatus of claim 1 wherein at least one of the plurality of pipeline stage circuits is operable to perform a first part of an operation on a header portion of a packet such that a second part of the operation on the header portion of the packet can be performed by a second pipelined switch.

19. A method of switching packets comprising
receiving a packet having a header portion, an optional corresponding tail portion, and a class of service indicator;
switching the packet through a pipelined switch having a plurality of packet header buffers (PHBs), a plurality of PHB pointers wherein each of the plurality of PHB pointer points to a corresponding one of the plurality of PHBs, and a plurality of pipeline stages connected in a sequence, the plurality of pipeline stages including at least a first stage and a last stage, said switching further comprising:
beginning the sequence in each of the plurality of pipeline stages substantially simultaneously with each other of the plurality of pipeline stages;
passing data to a next stage in said sequence when an operation performed by each of the plurality of pipeline stages is completed;
accessing a content addressable memory as part of the operation performed by at least one of the plurality of pipeline stages;
reading and storing the header portion in one of the plurality of PHBs using at least one of the plurality of PHB pointers; and
outputting a modified header portion based on the header portion.

20. The method of claim 19 further comprising:
receiving information as a result of the accessing a content addressable memory; and
modifying the header portion based on the received information.

21. The method of claim 19 further comprising:
storing at least one of access control list data, extended access control list data, committed access rate data, and netflow data in the content addressable memory.

22. The method of claim 19 further comprising:
storing at least one of packet classification information and network flow statistics in the content addressable memory.

23. The method of claim 19 further comprising:
buffering the modified header portion using a receive buffer manager (RBM), the buffering further comprising:
   joining the modified header portion and the corresponding tail portion to form a modified packet;
   storing and enqueuing the modified packet using the class of service indicator; and
   dequeuing the modified packet using the class of service indicator.

24. The method of claim 23, wherein the enqueuing the modified packet further comprises:
executing a congestion avoidance algorithm using a circuit in the RBM.

25. The method of claim 19 further comprising:
receiving a cell from a switch fabric; the cell having a header portion,
switching the cell through a second pipelined switch having a second plurality of packet header buffers (PHBs), a second plurality of PHB pointers wherein each of the second plurality of PHB pointers points to a corresponding one of the second plurality of PHBs, and a second plurality of pipeline stages connected in a sequence, the second plurality of pipeline stages including at least a second first stage and a second last stage, said switching further comprising:
   beginning the sequence in each of the second plurality of pipeline stages substantially simultaneously with each other of the second plurality of pipeline stages;
   passing data to a next stage in said sequence when an operation performed by each of the second plurality of pipeline stages is completed;
   accessing a second content addressable memory as part of the operation performed by at least one of the second plurality of pipeline stages;
   reading and storing the header portion of the cell in one of the second plurality of PHBs using at least one of the second plurality of PHB pointers; and
   outputting a modified header portion of the cell based on the header portion of the cell.

26. The method of claim 19 further comprising:
sending the header portion from the last stage to the first stage.

27. The method of claim 19 wherein the outputting a modified header portion further comprises:
sending the modified header portion from the last stage to the first stage.

28. The method of claim 19 further comprising:
performing, in the pipelined switch, a first part of an operation on a header portion of a packet; and
performing, in a second pipelined switch, a second part of the operation on the header portion of the packet.

29. An apparatus for switching packets, each packet having a header portion, an optional corresponding tail portion, and a class of service indicator, the apparatus comprising:
a plurality of buffers;
a plurality of buffer pointers, each of the plurality of buffer pointers pointing to a buffer; and
a plurality of means for processing packets, the plurality of means for processing packets being connected in a sequence and wherein:
   each of the plurality of means for processing packets begins an operation substantially simultaneously with each other of the plurality of means for processing packets;
   at least one of the plurality of means for processing packets passes data to at least another of the plurality of means for processing packets;
   at least one of the plurality of means for processing packets further comprises a means for accessing a content addressable memory;
   at least one of the plurality of means for processing packets further comprises a means for reading the header portion and storing the header portion in at least one of the plurality of buffers; and
   at least one of the plurality of means for processing packets further comprises a means for outputting a modified header portion.

30. The apparatus of claim 29 further comprising:
a receive buffer manager means for:
   joining the modified header portion and a corresponding tail portion to form a modified packet;
   buffering the modified packet in a receive packet buffer;
   enqueuing the modified packet using the class of service indicator; and
   dequeuing the modified packet using the class of service indicator.

31. The apparatus of claim 29 further comprising:
a second plurality of means for processing packets, the second plurality of means for processing packets receiving one or more packets from a switch fabric and being connected in a second sequence wherein:
   each of the second plurality of means for processing packets begins an operation substantially simultaneously with each other of the second plurality of means for processing packets;
   at least one of the second plurality of means for processing packets passes data to at least another of the second plurality of means for processing packets;
   at least one of the second plurality of means for processing packets further comprises a means for accessing a content addressable memory;
   at least one of the second plurality of means for processing packets further comprises a means for reading the header portion and storing the header portion in at least one of the plurality of buffers; and
   at least one of the second plurality of means for processing packets further comprises a means for outputting a modified header portion.

32. The apparatus of claim 29 further comprising:
a transmit buffer manager means for:
   receiving one or more packets from a switch fabric;
   buffering each of the one or more packets in a transmit packet buffer;
   enqueuing the one or more packets using the class of service indicator; and
   dequeuing the one or more packets using the class of service indicator.

33. The apparatus of claim 29 wherein at least one of the plurality of means for processing packets further comprises a means for performing a first part of an operation on a header portion of a packet such that a second part of the operation on the header portion of the packet can be performed by at least one of a second plurality of means for processing packets.

* * * * *